(12) United States Patent
Hofmann

(10) Patent No.: US 12,389,961 B2
(45) Date of Patent: Aug. 19, 2025

(54) FUNCTIONAL LEATHER PRODUCT AND A METHOD FOR PRODUCING THE SAME

(71) Applicant: Mercurius SLG LTD, Hong Kong (CN)

(72) Inventor: Wilm Hofmann, Frankfurt am Main (DE)

(73) Assignee: MERCURIUS SLG LTD, Hong Kong (CN)

( * ) Notice: Subject to any disclaimer, the term of this patent is extended or adjusted under 35 U.S.C. 154(b) by 543 days.

(21) Appl. No.: 17/695,365

(22) Filed: Mar. 15, 2022

(65) Prior Publication Data
US 2022/0295924 A1 Sep. 22, 2022

(30) Foreign Application Priority Data

Mar. 16, 2021 (EP) ..................................... 21162929

(51) Int. Cl.
*A41D 19/00* (2006.01)
*B32B 3/10* (2006.01)
(Continued)

(52) U.S. Cl.
CPC ............ *A41D 19/0006* (2013.01); *B32B 3/10* (2013.01); *B32B 7/12* (2013.01); *B32B 9/025* (2013.01); *B32B 9/047* (2013.01); *B32B 2250/03* (2013.01); *B32B 2250/40* (2013.01); *B32B 2307/202* (2013.01);
(Continued)

(58) Field of Classification Search
None
See application file for complete search history.

(56) References Cited

U.S. PATENT DOCUMENTS

| 704,707 A | 7/1902 | Pianko |
| 1,516,571 A | 11/1924 | Moore |
| (Continued) | | |

FOREIGN PATENT DOCUMENTS

| CN | 202603695 U | 12/2012 |
| CN | 204444377 U | 7/2015 |
| (Continued) | | |

OTHER PUBLICATIONS

EP21162929.0 Extended European Search Report dated Sep. 9, 2021 (10 pages).

(Continued)

*Primary Examiner* — Jeffrey D Washville
(74) *Attorney, Agent, or Firm* — Amundsen Davis LLC

(57) ABSTRACT

The invention provides a functional leather product, preferably for a glove or a shell of a glove having a capacitive, near field communication enabling perceptible and/or protective function, and a method for producing said leather product. The leather product comprises leather in form of a cut piece comprising at least in part a sandwich structure of at least two layers, wherein said sandwich structure comprises a first layer, which comprises an upper split leather obtained by at least partially splitting said cut piece of leather parallel to its upper surface at a predetermined cross-sectional depth of maximum about 4.95 mm, preferably 2.5 mm and a second layer comprising a functional layer, wherein the functional layer is attached at least in part to the first layer.

19 Claims, 22 Drawing Sheets

(51) Int. Cl.
*B32B 7/12* (2006.01)
*B32B 9/02* (2006.01)
*B32B 9/04* (2006.01)

(52) U.S. Cl.
CPC . *B32B 2307/7145* (2013.01); *B32B 2307/732* (2013.01); *B32B 2437/02* (2013.01)

(56) References Cited

U.S. PATENT DOCUMENTS

| | | |
|---|---|---|
| 4,850,838 A | 7/1989 | Wagner et al. |
| 2003/0068452 A1 | 4/2003 | Schaefer |
| 2009/0089915 A1 | 4/2009 | Franke |
| 2009/0162651 A1* | 6/2009 | Rios ................ A63B 60/08 |
| | | 428/419 |
| 2011/0020590 A1 | 1/2011 | Yoneda et al. |
| 2013/0168014 A1 | 7/2013 | Wieke et al. |

FOREIGN PATENT DOCUMENTS

| | | |
|---|---|---|
| DE | 29903664 U1 | 5/1999 |
| DE | 19903308 A1 | 8/2000 |
| EP | 2762575 A1 | 8/2014 |
| EP | 2762575 B1 | 5/2019 |
| WO | 2018/032026 A1 | 2/2018 |
| WO | 2020/209717 A1 | 10/2020 |

OTHER PUBLICATIONS

European Patent Office Communication Under Rule 71(3) EPC, Jan. 7, 2025, regarding EP Application No. 21162929.0, pp. 1-80.

\* cited by examiner

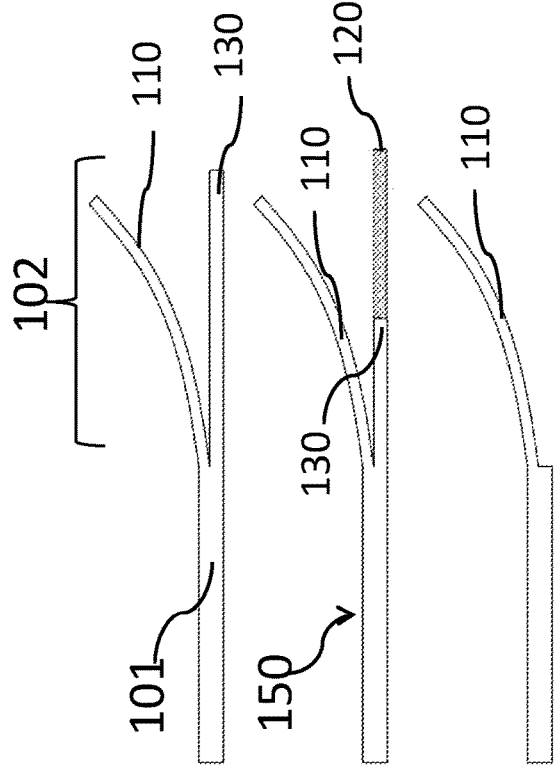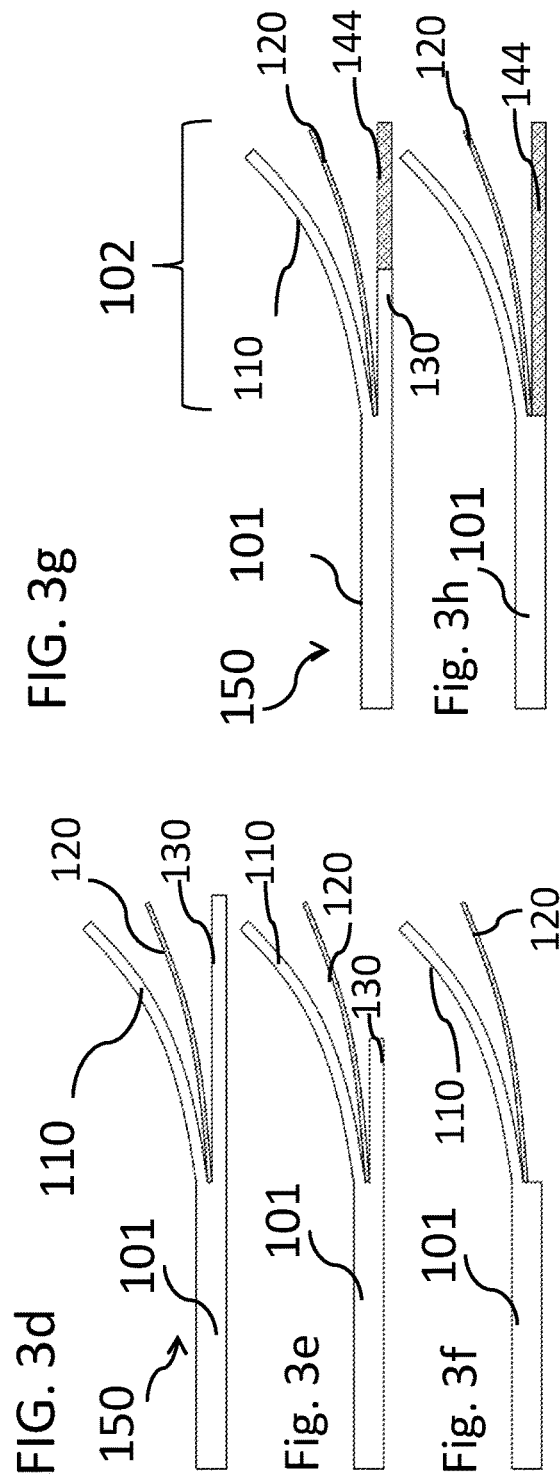

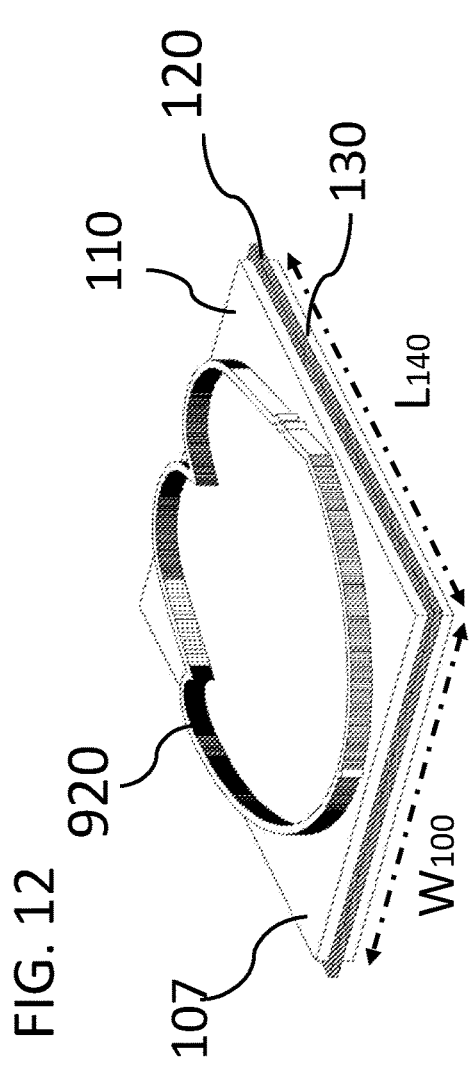
FIG. 12
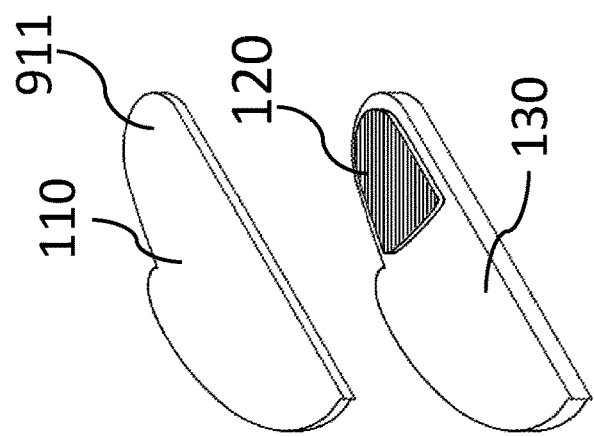
FIG. 13
FIG. 14

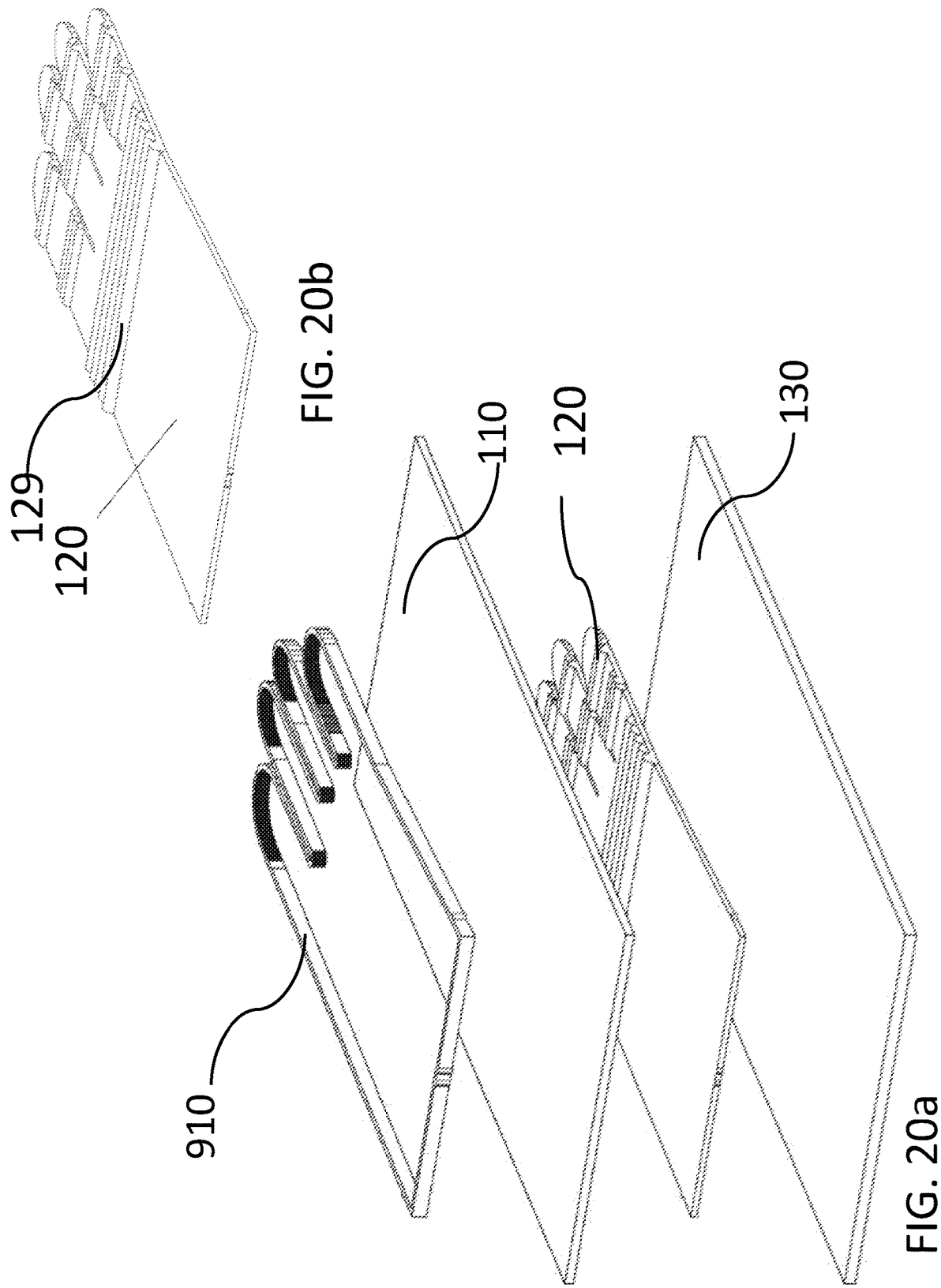

FUNCTIONAL LEATHER PRODUCT AND A METHOD FOR PRODUCING THE SAME

FIELD OF THE INVENTION

The present invention relates to a functional leather product for a glove, more particularly for the shell of a glove, comprising at least in part at least two layers and a method of producing the same. Further, the present invention relates to a glove made of said functional leather comprising at least in part two or more layers.

BACKGROUND

In general, gloves made from textile or other material are used to protect the glove wearer against cold, pathogens, force impact and harmful substances. Further, other functions are conceivable. There is the need that especially gloves made from leather or leather-like materials are improved to either enhance above mentioned functions or provide additional functions in at least a part of the glove. In general, the provision of functional parts in leather articles are desirable.

One drawback with the use of leather gloves is that the user cannot operate, for example, touch screens or other devices, because the glove leather is electrically non-conductive. Various electronic devices, such as mobile phones or other mobile terminals, employ touch screen inputs, typically in the form of capacitive touch screen sensors. Additionally, automotive vehicles or other machines may be equipped with capacitive sensors, which may be used as switches to control various devices and perform various functions. Furthermore, public input devices such as automatic machines to buy e.g. tickets for trains, or to retrieve money, often work on the basis of capacitive touch screens. However, such switches or capacitive touch screens used as input device, are usually enabled if a user touches or contacts the upper surface of the device with bare hands in order to change the local capacitance.

A common kind of capacitive touch screen or other capacitive devices comprise e.g. a grid of driving lines that carry a current and further sensing lines to detect changes in capacitance. A small voltage is applied to the driving lines within the device and maintains a uniform electrostatic field. When a conductor, such as a human finger, touches or closely approaches the outer screen surface of the touch screen it causes a change in the local electric field. This change in capacitance can be detected by the sensing lines.

However, a capacitive touchscreen or switch is not operable, when an electrically insulating layer is arranged between the human skin and the surface of the input device. The majority of textile and non-textile materials, which are used to produce clothing, including gloves, do not enable a sufficiently conductive connection between a skin of a user and a capacitive input device. In addition, they are also thicker than the depth of the electric field of the capacitive device. Thus, it is one objective of the present invention to provide a leather product and more particularly a glove enabling the operation of capacitive devices.

In general, it is an objective that a final leather glove can be used as an input device by providing a capacitive function or by providing a smart glove, whereas the outer appearance and thickness of the functional glove is not significantly altered compared to a normal leather glove.

There are already several solutions that enable the interaction with touch screens whilst wearing leather gloves. One example is the use of conductive yarns sewn through the finger tips, so as to touch the wearers' skin on the one side and protrude through the cross-section of the glove shell to the outer-side. Another example is the use of leather that has been treated with touch-enabling chemical mixtures, which is generally conductive particulate with binding resins, to penetrate part of a cross section of the leather or the entire leather. Nevertheless, these solutions are unsatisfactory for a variety of reasons.

Conductive yarn is subject to wear and tear, reduces tactility, collects dirt particles, and decreases the basic protective properties of gloves against cold temperatures, because electrically conductive thread is not a good thermal insulator. Furthermore, leathers that facilitate the use of a touchscreen device often suffer from poor tear strength compared to regular (non-conductive) leathers, often due to perforations or voids through a significant proportion of the cross section, where impregnated resin and conductive particulate resides. Accordingly, it is an objective of the present invention to avoid damage to the entire cross-section of the fibrous structure of leather and avoiding a significant reduction in strength.

Furthermore, experience has shown the functionality of existing leathers, that facilitate the operation of a touch screen device, often diminishes over time. This occurs if conductive patches on the outer surface of the leather are disrupted, abraded, or lose mechanical, and therefore conductive, integrity during wear. On the other hand, if resins with conductive particulate are used, the homogeneity and density of the conductive particulate within the resin is reduced e.g. by flexing such that the local conductivity decreases and therefore the ability to facilitate the use of a touch screen device diminishes as a direct consequence.

If conductive particulate liquid is deposited in voids such as pin holes or inter-fibrillary spaces through the leather cross-section, problems of an amorphous and non-uniform deposition occur. First, as the mechanical properties of the leather fibres and those of the resin-particulate in between are dissimilar, a disassociation or breaking down of the resin-conductive-particulate is likely with extended use. Second by preparing voids, the integrity of the fibrous leather material has been reduced to a large proportion and thereby reducing the tear and tensile strength.

Accordingly, it is another objective of the present invention to provide a leather product and gloves made therefrom that have a greater longevity while maintaining functionality. Further, there is the need to provide uniform mechanical performance characteristics especially at the outer surface of the leather and to avoid vertical penetration through the entire cross-section of the leather.

There is further the problem that commercially available leathers, that facilitate the operation of a touch screen device, are also limited in colour availability. This problem is met if the conductive particulate is carbon and the black colour thereof limits the colour palette. This problem appears to be the case if more translucent colouring techniques such as dyestuffs are employed and/or more opaque i.e. more covering colouring techniques are employed such as pigments. That is to say, leathers chemically altered to enable touch is limited in the colours that tanners can provide. While all basic Hues according to the Mansell colour system might be possible, suppliers are often not able to achieve certain levels of Value and Chroma. The overall visual and haptic quality of leather that has chemically be treated to enable touch functionality is almost universally poor when compared to an aniline dyed, chrome tanned leather, and, albeit to a lesser degree, also compared to many semi aniline leathers typically used in manufacturing dress gloves made from leather. For example, due to the use of e.g. resins containing conductive particulate, which fill interfibrillary voids of the leather, the rigidity compared to a normal glove leather is increased. Accordingly, there is the objective to provide leather products that maintain haptic and visual variety as well as the rigidity as of a regular glove leather and at the same time facilitate operation of a touch screen if used in a glove.

Furthermore, glove leathers that facilitate the operation of a touch screen device are typically only commercially available in specific leather types and from specific origins, most typically chrome tanned goat and sheep skins. In contrast, less common leather types, such as for example deer, moose or fish leather, and leather made with less common tanning practices, such as metal free leather, are not readily commercially available on the market, as the cost of doing so in a fragmented market are, apparently, unattractive. Accordingly, it is another objective of the present invention to provide a leather product that can economically be produced and combined with all kinds of available leather types.

Another objective of the present invention is to provide an improved protective function especially in leather products. These functions are important to facilitate operation of machines or tools, or if the glove wearer needs to be protected against heat or flames. Protective gloves can also be advantageous for use in medicine or in professional or private contexts. There is the need for leather products for gloves that provide improved impact-resistance, reduce abrasion and protect against heat, pathogens, bacteria, viruses or fungus and other harmful substances.

It is common practice to improve protective properties of the outer surface of a leather glove by combining leather with other materials in certain areas of the glove, for example by combining leather fingers with other materials that outperform leather in terms of, for instance, rub fastness or cut resistance. Drawback to this method is a lack of uniformity of the resulting material, as the alternative material is either clearly visible from the outside when some parts of the surface area are made of alternative materials, or easily recognisable to the touch when the alternative material is used in combination with leather. It is a further objective of this invention to overcome these drawbacks.

It is another objective to provide a functional leather product or a glove made of said leather product that has also within its functional part the feel, flexibility and tear strength of natural leather. It is another objective that a leather product for a functional leather glove provides a homogenous overall thickness.

In the context of the present invention the term "leather" refers to material created by tanning animal raw hides and skins. The surface of the leather can either remain intact (nappa) or be mechanically treated e.g. by buffing with abrasive media to produce a nubuck or suede nap. Moreover, other common surface treatments with dyes, waxes, oils or aesthetic modifiers can be applied, such that the hide's natural surface is mostly retained.

In the context of this disclosure, the term "leather" is also used to refer to any leather-like materials or leather substitutes. Such leather-like materials may consist mainly or partially of genuine leather or be a product of fibers made from leather scrap and thermoplastic material as e.g. polyurethane latex. Leather-like materials may also be made entirely of polymers, silicone-polymers, polyurethane, water-based PU, elastomers and/or recycled plastic. Commercially available leatherlike products can be for example Bluesil™ Textile Coating silicone (TCS) products by Elkem.

Further, the term "leather" is, in the context of this disclosure, also used to refer to so-called vegan leathers. Said leather-like materials are made from fruit waste such as of pineapple leaves, apple peels, cactus or the like. Further known vegan leathers made from natural products are mushroom leather, made from mycelium, or cork leather.

In the context of this disclosure, the term shell defines the outermost layer of a glove, if a glove has a lining e.g. a sheep wool knit lining and/or inserts e.g. made from eVent. If linings are detachably connected to the shell, they can be exchanged for washing or be replaced with linings of another thickness to better regulate warmth. Moreover, the shell can be used alone.

Leather can be separated into discrete layers by a process known as "splitting", using common splitting machines. One commonly known leather splitting machine is for example CS Osbourne & Co, Splitting Machine No. 86, or a band knife splitter like Honbo HB-L420W. In the context of this disclosure, the term "split" refers to a single layer from a leather that has been separated over its whole area or in part into two layers i.e. upper split leather and lower split leather.

SUMMARY OF THE INVENTION

The present invention addresses one or more of the objectives mentioned above. The problems posed are solved according to the subject-matter of the independent claims appended herewith. Various features and advantages of the invention will be set forth in part in the following description, or may be obvious from the description and figures, respectively.

The invention provides a functional leather product, preferably for a glove having a smart, capacitive, near field communication enabling perceptible and/or protective function, the leather product comprising:

leather in form of a cut piece comprising at least in part a sandwich structure of at least two layers, wherein said sandwich structure comprises a first layer, which comprises an upper split leather obtained by at least partially splitting said cut piece of leather parallel to its upper surface at a predetermined cross-sectional depth of maximum about 4.95 mm and a second layer comprising a functional layer, wherein the functional layer is attached at least in part to the first layer.

By splitting cut pieces of simple and specific geometry rather than splitting as basis material entire skins or hides, which have no specific geometry and are therefore harder if not impossible to process, allows the split region to be precisely defined. This is especially important when only partial splitting of a cut piece is intended. Although it is possible, it would be disadvantageous to partially split a whole skin in the first step and then cut out a cut piece in a second step.

Therefore, accurately splitting leather to a homogenous thickness of the final split leather, such as a first layer with a maximum thickness of about 4.95 mm, preferably about 2.5 mm, can best be obtained if a cut piece serves as basis material for the subsequent splitting process. In other words, if, instead of cut pieces, whole hides or skins are split, the accuracy in thickness of the resulting upper split is significantly reduced and may lead to uneven results when compared to the narrow thickness tolerances of an upper and lower split leather of a cut piece of specific geometry.

The selected and preferred size of the cut piece of the leather that is to be optimized with a function depends on the type and design of the gloves, for example whether the gloves are for women, children or men, and whether the cut piece of leather is configured, for example, for a large palm and cuff section or a small finger tip. In other words, leather is cut into various shapes of specific geometry that are necessarily larger than the final glove component, wherein the final glove component e.g. thumb contour, a palm section, a back component or fourchette etc., is subsequently cut out of the cut piece of specific geometry. The aforementioned final glove components of specific contours are the industry standard of cutting work pieces configured to be assembled into dress gloves. These classic glove contours originated in France and have been in use, with slight variations, for generations. However, a large variety of alternative cutting layouts exists beside the Classic layout, such as the so-called Butterfly Cut and the Gun Cut, Lobster Gloves, Mittens etc., and the invention is equally applicable to such alternative layouts of final glove components.

The length of a cut piece for a palm side work piece in the classic/French layout encompasses the entirety of the length of the glove from the tip of the fingers through the slip-in, i.e. the end of the glove where the hand is inserted. The slip-in is necessarily located somewhere between the wrist for a very short glove and just below the shoulder for a very long glove, such as a gauntlet or opera glove for adults. For such a palm piece of a very long adult glove in classic/French cut, the exemplary length of the palm side cut piece is between about 600 mm and 800 mm. For most dress and outdoor gloves, the length more typically varies between 100 mm for a children's glove and 400 mm for a women glove of medium length. Even more common are length measurements of classic/French palm pieces for men's and women's gloves of about 200 mm to 300 mm.

The width of a palm work side is also depending on style and category (Children, Female or Male) and may range for instance between 75 mm (children) and 150 mm (oversized male) for classic/French two piece cutting knives, wherein the upper hand and lower hand are cut from two separate pieces that are then connected on two sides, such as by attachment means, and between 150 mm and 300 mm for one piece cutting knives, wherein the upper and lower hand are cut out of a single piece of leather so that they remain connected on one side and only have to be sewn together on the other side. As known in the art of glove making, classic/French thumb work pieces may vary in the width for instance between 30 mm and 150 mm for a two-piece children's thumb or a one-piece oversized male thumb cutting knife, respectively. Wherein the length may be typically 75 mm through 190 mm. A multitude of alternative thumb shapes are also usable, with different dimensions.

Depending upon the type and design of the glove, the thickness of the leather subsequent to the leather manufacturing process and prior to be split according to the present disclosure can be maximum about 5 mm when used for certain types of gloves, such as the gauntlet section of a ceremonial glove, but would typically be less than 1 mm, preferably less than 0.8 mm, more preferably less than 0.6 mm for gloves that are designed to primarily protect against the elements or cold weather, such as dress gloves.

The present invention addresses the objective to provide after splitting a resulting leather product or a glove shell, wherein the layer split from the cut piece according to the present disclosure has an even thickness. The cut piece of leather can be separated into discrete layers by using common splitting machines as for example a band knife machine like the Honbo HB-L420W. If the splitting process is used for fully splitting the upper and lower split layers, the second layer or the functional layer may have the same or smaller dimensions as the first layer. In one embodiment the functional layer would extend over the full area of the upper split leather. According to an alternative embodiment, wherein the cut piece is partially split, it is possible to select a thickness of the lower split leather equal to the thickness of the functional layer. In this embodiment the part of the lower split leather, which is cut off after splitting, can be replaced by the functional layer. In this way the leather product has an even homogenous and even thickness throughout the entire longitudinal extension. However, other thicknesses or extensions of the functional layer can be chosen as long as a sandwich structure of at least two layers in part of the leather product is provided.

The functional leather product according to a preferred embodiment of the invention is characterized by a first layer or an obtained upper split leather with an overall thickness in the range of about 0.05 mm to 0.50 mm, preferably of 0.15 mm to 0.35 mm. Depending on the splitting machines used and size of the cut piece, a selected thickness with standard variations as low as possible can be achieved after splitting. Preferred standard variations with regard to the overall thickness are +/−0.05 mm, more preferably +/−0.02 mm.

Each of the above overall thicknesses of the first layer are obtained by selecting a corresponding predetermined cross-sectional depth, wherein the initial thickness of the leather from which the work piece is cut, has preferably an original thickness between 0.2 mm and 1.2 mm, more preferably between 0.4 mm and 0.8 mm before splitting the leather partially or completely.

The thickness can be measured by commercially available thickness gauges as for example precision gauges by Otto Specht GmbH & Co KG in Stuttgart, Germany (www.otto-specht.de). Measurements reported in this document have been performed using the aforementioned gauge, unless otherwise noted. There are other gauge manufacturer such as Satra Technology in UK. The thickness can be evaluated according to standard procedures as defined in EN ISO 2589 (International Organization for Standardization Physical and mechanical tests-determination of thickness).

The accuracy i.e. narrow tolerances of at least 0.05 mm, preferably 0.02 mm, can best be achieved by splitting cut pieces of simple and specific geometry rather than entire skins, which have no specific geometry and is therefore harder to process, and in which the position of the final shape is not yet easily determinable. A specific and simple geometry and a minimum area of the cut piece is also advantageous in view of the final glove shapes, such as thumbs or upper hands, that have a geometry that may be too difficult or too small to split cleanly and impractical for attaching the functional layer and optionally further additional layers. The preferred accuracy of the thickness of the split leather ensures that the functional layer can be positioned at the correct cross-sectional depth in the final leather product. This is especially important if the functional layer has a capacitive function and is used e.g. to operate touch screen phones, wherein the thickness of the first layer on top of the functional layer should not surpass 0.5 mm, preferably 0.45+/−0.05 mm or preferably 0.25+/−0.10 mm for a preferred trade-off between touch functionality and surface material integrity of many typical glove leather types.

According to a further embodiment of the functional leather product, the second layer has a thickness of less than 1 mm; preferably less than 0.5 mm or more preferably less than 0.2 mm and/or the second layer is selected from a group of functional layers comprising:

a conductive sheet, a reinforcement sheet, an abrasive resistant layer, a three-dimensional layer with protruding or depressed structures relative to said thickness, an antimicrobial, antibacterial and/or antiviral sheet, a water-resistant membrane, a heat or flame resistant layer, a flexible near field communication device or combinations thereof.

In general, the thickness of a conductive functional layer below the first layer or upper split leather can have smaller or greater thicknesses than the upper split leather or first layer. It is emphasized that independently of the material or function of the functional layer, said functional layer needs to be flexible and/or thin so as to maximize tactility in the glove, i.e. a thickness of equal or less than 1 mm is suitable. For more flexibility, a thickness of less than or equal to 0.5 mm or more preferably equal to or less than 0.2 mm is selected. Moreover, the thickness of the functional layer is preferably selected to be smaller or equal than the first layer in order to not significantly alter the feel of the final leather product.

Moreover, it is noted that in the context of the present invention, wherein the leather product is configured to be assembled into a shell of a glove, the first layer of the sandwich forms the upper or outer side of said shell, wherein the lower side of the second layer of the shell is facing the inner discrete parts of the glove if any, such as inserts (for instance an eVent or similar membrane), lining or liner, which ultimately are adjacent to the skin of a glove wearer. The functional layer can be attached by attachment means such as any type of fastener, stitching, sewing, heat bonding and/or an adhesive. Especially flexible adhesive are used and can be applied by either spraying or roller coating. Further, the functional layers are flexible and have a thickness of less than 1 mm or preferably less than or equal to 0.2 mm to advantageously ensure that the flexibility of the final leather product including the sandwich structure, is similar to a normal glove. In this way the glove wearer can compress the sandwich structure as the regions without the functional layer and flex the fingers as in common leather gloves. Accordingly, the glove wearer can advantageously continue to manipulate glove as required for using e.g. touch screens or other operations where fingertip sensitivity is required.

It is noted that a conductive sheet for enabling use of touch screens may be combined with e.g. a reinforcement sheet or an abrasive resistant layer as e.g. a third layer below the second and conductive layer, in order to increase the mechanical strength and/or abrasion resistance at least in regions as finger tips, which will be used more frequently than other parts of the glove to touch e.g. touchscreens.

By selecting abrasive-resistant materials containing e.g. synthetic fibres, such as nylon or polyester or Poly-Aramids or Meta-Aramids, in fabric form or in the form of highly flexible sheets, or Mesh or Scrim, an abrasive-resistant layer of the leather product can be provided to improve properties with regard to hardness and mechanical stress resistance, impact resistance, cut resistance, heat resistance or abrasion resistance. Especially if a sandwich of only two layers is used, it is important to improve the reinforcement properties of the functional layer in order to improve the durability of the leather product. Also, if the functional layer is not an outer surface of the final glove, as in a three-layered sandwich structure, reinforcement sheets and/or abrasive resistant layers are advantageous, because in case the first or third layer of leather become damaged, the presence of the abrasion-resistant sheets or reinforcement sheets afford additional protection against abrasion forces and protect the hand of the glove wearer.

It is noted that reinforcement sheets may also comprise cut and/or puncture-resistant fabrics or flexible sheets that contain for instance Kevlar® fibres, wire-woven technical textiles, nylon blend, steel meshes and/or nitrile rubber sheets in order to enhance cut and/or puncture resistance of gloves.

A three-dimensional layer with elevated or depressed structures relative to the thickness of the functional layer can also serve for better abrasion resistance or to improve mechanical strength. Alternatively, or in addition, such elevated or depressed structures can be used to create special designs and patterns for marketing or making the leather product unique for the manufacturer showing e.g. a logo or the like.

Further, it is noted that one can advantageously select as a functional layer an antimicrobial, antibacterial and/or antiviral sheet. These kinds of sheets contain antimicrobial and/or antiviral agents in order to sustain an essentially bacteria-free, fungus-free and/or virus free environment within the glove. This can be advantageously employed because the hands can perspire inside the glove, especially within the part of the glove having a non-permeable or water-resistant functional layer. Further, if enhanced hygienic measures have to be taken as in hospitals or in case of a virus pandemic an antimicrobial and/or antiviral sheet can avoid or at least reduce the spread of infections after donning such a functional glove. If the gloves are used with public automatic machines having touch screens such antimicrobial barriers can also be advantageous in order to prevent bacteria or viruses to pass through the glove.

A potential anti-microbial agent can be selected from the group comprising chlorhexidine or salts thereof or biguanides such as for example polyhexamethylene biguanide hydrochloride (PHMB) or salts thereof. Several types of suitable bactericides and/or virucide agents and/or insecticidal agents having low toxicity and low sensitization or irritation potential for a human skin can be employed as long as an effective concentration is provided for rendering bacteria, insects, viruses or fungi harmless.

If the gloves are configured to withstand heat, the functional layer of the leather product can be a heat resistant layer comprising heat resistant textiles, sheets or films as for example polyimide films, ceramic fibre textiles, graphite fibreglass and aluminated fabrics. In order to enhance flame retardant properties of the leather product and to better resist high temperatures the functional layer may comprise flame retardant textiles, films or sheets, polymer-coated fibreglass fabrics treated with flame retardants and finished with a high-temperature silicone overcoat. Flame retardant polyethylene films or flame-retardant polyethylene terephthalate (PET) films.

In order to provide a smart glove and enable contactless communication between a glove wearer with an electronic device, the functional layer can comprise a flexible near field communication (NFC) device. This thin NFC device or tag has the advantage that it is programmable for various devices and there is no need of a battery. For, instance by simply presenting the glove with such functional layer an electronic device can be controlled in order to open doors, clock-in to work, make electronic payments. Such a NFC device can for example be combined with a capacitive function in order to securely identify that the glove wearer is allowed to operate the capacitive device.

According to another aspect of the present disclosure the sandwich structure of the functional leather product further comprises:
- a third layer, which is the lower split leather obtained from at least partially splitting said cut piece of leather and is adapted to have the longitudinal extension of the first layer or less; wherein the third layer is attached to the surface of the second layer and optionally the first layer, and may be attached by attachment means.

It is noted that a partial splitting of the cut piece can advantageously save material of the second layer. It is noted that providing a sandwich structure only in parts of the leather product e.g. for a glove with capacitive function is possible, because if the final glove is assembled it is sufficient if the three layered sandwich structure is positioned appropriately in the areas of the fingers and thumbs in order to facilitate operation of the capacitive touch screen device.

This three-layered sandwich structure of the leather product, wherein the functional layer is attached between the first and second layer, is configured to look very similar to a normal glove leather because the functional sheet is sandwiched between the first and second leather layers. That is to say both the upper split leather and the lower split leather remain identical to those of the original unsplit glove leather and only if one examines the cross-section of the sandwich structure one will recognize the functional interlayer. A further advantage of the three layered sandwich structure is that the leather product feels very similar to the original cut piece of leather, because both outer surfaces of the final leather product are made from leather. Another advantage is that the leather product can be obtained by splitting all kinds of available leather types. There is also no limitation with regard to colour availability, because the leather is only mechanically split into an upper split leather and lower split leather and no chemical treatment is required.

If the extension of the first and second layers are the same but the functional layer in-between is smaller, then the outer regions of the third layer can be directly attached by adhesive or stitching to the first layer such that in the final leather product the sandwiched functional layer cannot be seen. For a secure attachment of the second layer to the first and third layer respectively an adhesive over at least parts of the second layer as e.g. in the border regions of the second layer or over the entire area of the second layer, can be used.

In an alternative embodiment in addition to the third layer a fourth layer may be provided to produce either
  i) a third layer made of the lower split leather and the fourth layer or
  ii) a four-layered sandwich structure.

In embodiments comprising a fourth layer, or further additional layers, within the sandwich structure of the shell, said layers can either be positioned below the third layer or in the same height as the third layer or lower split leather. Alternatively, a four-layered or further layered structure of more than four layers can be provided by adding other sheet-like materials for instance adjacent to the functional layer. In one embodiment the additional layer could be another functional layer. For instance, a conductive sheet could be on top of an abrasive resistant sheet or antimicrobial sheet. Said two functional layers can be embedded between the upper split leather and the lower split leather to form a four layered sandwich structure. Further configurations are possible.

Preferred further layers in the glove but not within the shell of the glove are linings, insulation, cushioning products, design elements, or a combination of said inner layers, which are suitable for a glove. It is noted that such layers can favourably be attached only partially with the shell, with e.g. a few stitches at the corresponding ends of the shell and the none-shell layers e.g. at the finger tips and the slip-in area, etc., Other way of attachments, which extend over the entire adjacent surface as bonding, may also be used.

According to a preferred embodiment of the disclosure, the piece of leather consists of genuine leather and is cut from hides or skins, wherein the upper split leather and/or the lower split leather are obtained by splitting parallel to the surface at the cross-sectional depth of the junction zone between the grain layer and corium layer of the genuine leather.

In this way the naturally existing structurally distinct layers of leather, which have not yet been altered subsequent the leather manufacturing process, can be advantageously utilized.

The two layers obtained by splitting of a cut piece of leather produce an upper split leather and a lower split leather, respectively. According to one preferred embodiment of the disclosure, the first layer or upper split leather includes the grain layer or at least a part of it.

According to the disclosure the third layer of the functional leather product or lower split leather comprises the entire corium layer or at least a portion of the corium layer.

According to an alternative embodiment of the disclosure the first layer or upper split leather comprises an upper layer of the corium layer and/or at least a portion of the grain layer.

The following exemplary embodiments of the invention refer to leathers that have been altered or treated by a tanner or leather trader prior to the splitting within the scope of this invention. If leather was treated by e.g. buffing and the grain layer has been partially or completely removed, said leathers are called nubuck (with a buffed grain layer) or suede (with the grain layer completely removed and a napped surface).

The splitting of the cut piece of such pre-treated leathers, wherein the grain layer was only partially removed in the pre-treatment, results in an upper split leather with a buffed grain layer. Splitting suede results in an upper split leather comprising substantially the upper corium layer.

According to another embodiment of the disclosure, the second and functional layer is a conductive silicon sheet or a conductive rubber sheet having an area of at least approximately 50 $cm^2$.

It is noted that the minimum area of 50 $cm^2$ is sufficient if the first layer does not exceed a thickness of 0.50 mm. However, the minimum area of the conductive sheet can be reduced to at least 25 $cm^2$, or about 5 $cm^2$, or even as low as 1 $cm^2$, if at the same time the thickness of the first layer is reduced.

A capacitive function can be provided in a glove made of said leather product and having below the outer shell surface said conductive sheet with a minimum surface area of 50 $cm^2$ It is noted that the capacitive function is achieved although the outer surfaces of the sandwich structure and thus the upper split leather (first layer) and the lower split leather (third layer), which have been split from a cut piece of genuine leather remain identical to those of the original unsplit glove leather and are thus non-conductive. Moreover, no electrically conductive coatings are applied to the outer surfaces of the grain layer and/or corium layer to render the outer surface of the final glove conductive. Furthermore, for the purpose of a capacitive function, neither piercings nor punchings through the leather are foreseen nor a conductive liquid needed to be applied to either of the split leathers, according to the present disclosure.

It was surprisingly found by a series of practical tests according to the present invention that, although the leather layers as well as the adhesives used for laminating the layers together are non-conductive, the presence of an intermediate conductive functional layer made of silicone or rubber with a minimum area of at least 50 cm² suffice to enable sufficiently effective operation of a capacitive touch screen device, if the thickness of the first layer on top of the functional layer has a maximum thickness of 0.50 mm. The applicant has performed numerous experiments varying the thickness of the upper split leather and the surface area of the conductive sheet or second layer. An overview of examples of such experiments are shown in the tables 1a to 1d. In this context it is referred to table 1d, showing that once the minimum area of 50 cm² of the conductive sheet is provided below the first layer or between two split leathers, the resulting sandwich structure worked reliably (indicated with WO) to operate capacitive devices in twenty-seven out of twenty-seven measurements for first layers or upper split leathers measuring no more than 0.50 mm. If this exemplary combination of thickness of the first layer or upper split leather i.e. 0.50 mm, and a minimum area of the second layer of i.e. 50 cm² is ensured, the leather product is suited to reliably work (indicated with "WO" in the following tables 1a-1d) within an electric field of a capacitive device.

The required minimum area of the conductive sheet will vary depending on the thickness of the first layer or upper split leather (see first column of tables 1a-1d). Further it may depend on the type of leather. For example, a piece of sheep suede measured to have a thickness of the first layer of less than about 0.25 mm, can be enabled to reliably interact with a touchscreen when the second layer attached to the first layer comprises a conductive sheet having a surface area of at least about 5 cm².

TABLE 1a

Capacitive functionality (not working (NW), borderline working (BW) and reliably working (WO)) in dependence of thickness of the first layer or upper split leather and surface area of the second layer being a conductive sheet and covering 1 cm² or 2 cm².

| Leather Thickness of first layer [mm] | Amount/Number of Pieces Measured to Thickness | Surface area of functional or second layer (conductive sheet) 1 cm² | | | Surface area of functional layer 2 cm² | | |
|---|---|---|---|---|---|---|---|
| | | 1 cm² Not working (NW) | 1 cm² Borderline Working (BW) | 1 cm2 Working (WO) | 2 cm² NW | 2 cm² BW | 2 cm² WO |
| 0.1 | 3 | 2 | 1 | 0 | 2 | 0 | 1 |
| 0.125 | 2 | 2 | 0 | 0 | 0 | 2 | 0 |
| 0.15 | 1 | 1 | 0 | 0 | 0 | 1 | 0 |
| 0.175 | 2 | 2 | 0 | 0 | 0 | 1 | 1 |
| 0.2 | 3 | 3 | 0 | 0 | 2 | 0 | 1 |
| 0.225 | 1 | 1 | 0 | 0 | 0 | 1 | 0 |
| 0.25 | 3 | 3 | 0 | 0 | 2 | 1 | 0 |
| 0.3 | 4 | 4 | 0 | 0 | 4 | 0 | 0 |
| 0.325 | 1 | 1 | 0 | 0 | 1 | 0 | 0 |
| 0.4 | 4 | 4 | 0 | 0 | 4 | 0 | 0 |
| 0.5 | 4 | 3 | 0 | 0 | 3 | 0 | 0 |
| 0.6 | 3 | 3 | 0 | 0 | 3 | 0 | 0 |
| 0.7 | 4 | 4 | 0 | 0 | 4 | 0 | 0 |
| 0.8 | 3 | 3 | 0 | 0 | 3 | 0 | 0 |
| 0.9 | 2 | 2 | 0 | 0 | 2 | 0 | 0 |
| 1 | 1 | 1 | 0 | 0 | 1 | 0 | 0 |

TABLE 1a-continued

Capacitive functionality (not working (NW), borderline working (BW) and reliably working (WO)) in dependence of thickness of the first layer or upper split leather and surface area of the second layer being a conductive sheet and covering 1 cm² or 2 cm².

| Leather Thickness of first layer [mm] | Amount/Number of Pieces Measured to Thickness | Surface area of functional or second layer (conductive sheet) 1 cm² | | | Surface area of functional layer 2 cm² | | |
|---|---|---|---|---|---|---|---|
| | | 1 cm² Not working (NW) | 1 cm² Borderline Working (BW) | 1 cm2 Working (WO) | 2 cm² NW | 2 cm² BW | 2 cm² WO |

TABLE 1b

Capacitive functionality in dependence of thickness of the first layer or upper split leather and surface area of the second layer covering 3 cm³ or 5 cm³.

| Leather Thickness of first layer [mm] | Amount of Pieces Measured to Thickness | Surface area of functional or second layer (conductive sheet) 3 cm² | | | Surface area of functional or second layer (conductive sheet) 5 cm² | | |
|---|---|---|---|---|---|---|---|
| | | 3 cm² NW | 3 cm² BW | 3 cm² WO | 5 cm² NW | 5 cm² BW | 5 cm² WO |
| 0.1 | 3 | 0 | 1 | 2 | 0 | 0 | 3 |
| 0.125 | 2 | 0 | 0 | 2 | 0 | 0 | 2 |
| 0.15 | 1 | 0 | 0 | 1 | 0 | 0 | 1 |
| 0.175 | 2 | 0 | 0 | 2 | 0 | 0 | 2 |
| 0.2 | 3 | 1 | 0 | 2 | 0 | 0 | 3 |
| 0.225 | 1 | 0 | 0 | 1 | 0 | 0 | 1 |
| 0.25 | 3 | 0 | 0 | 3 | 0 | 0 | 3 |
| 0.3 | 4 | 2 | 1 | 1 | 0 | 1 | 3 |
| 0.325 | 1 | 1 | 0 | 0 | 0 | 0 | 1 |
| 0.4 | 4 | 3 | 0 | 1 | 0 | 2 | 2 |
| 0.5 | 4 | 3 | 0 | 0 | 2 | 0 | 1 |
| 0.6 | 3 | 3 | 0 | 0 | 3 | 0 | 0 |
| 0.7 | 4 | 4 | 0 | 0 | 4 | 0 | 0 |
| 0.8 | 3 | 3 | 0 | 0 | 3 | 0 | 0 |
| 0.9 | 2 | 2 | 0 | 0 | 2 | 0 | 0 |
| 1 | 1 | 1 | 0 | 0 | 1 | 0 | 0 |

TABLE 1c

Capacitive functionality in dependence of thickness of the first layer and surface area of the second layer covering 12.5 cm² or 25 cm².

| Leather Thickness of first layer [mm] | Amount of Pieces Measured to Thickness | 12.5 cm² NW | 12.5 cm² BW | 12.5 cm² WO | 25 cm² NW | 25 cm² BW | 25 cm² WO |
|---|---|---|---|---|---|---|---|
| 0.1 | 3 | 0 | 0 | 3 | 0 | 0 | 3 |
| 0.125 | 2 | 0 | 0 | 2 | 0 | 0 | 2 |
| 0.15 | 1 | 0 | 0 | 1 | 0 | 0 | 1 |
| 0.175 | 2 | 0 | 0 | 2 | 0 | 0 | 2 |
| 0.2 | 3 | 0 | 0 | 3 | 0 | 0 | 3 |
| 0.225 | 1 | 0 | 0 | 1 | 0 | 0 | 1 |
| 0.25 | 3 | 0 | 0 | 3 | 0 | 0 | 3 |
| 0.3 | 4 | 0 | 0 | 4 | 0 | 0 | 4 |
| 0.325 | 1 | 0 | 0 | 1 | 0 | 0 | 1 |

TABLE 1c-continued

Capacitive functionality in dependence of thickness
of the first layer and surface area of
the second layer covering 12.5 cm² or 25 cm².

| Leather Thickness of first layer [mm] | Amount of Pieces Measured to Thickness | 12.5 cm² NW | 12.5 cm² BW | 12.5 cm² WO | 25 cm² NW | 25 cm² BW | 25 cm² WO |
|---|---|---|---|---|---|---|---|
| 0.4 | 4 | 0 | 0 | 4 | 0 | 0 | 4 |
| 0.5 | 4 | 2 | 0 | 1 | 1 | 1 | 1 |
| 0.6 | 3 | 3 | 0 | 0 | 2 | 1 | 0 |
| 0.7 | 4 | 4 | 0 | 0 | 4 | 0 | 0 |
| 0.8 | 3 | 3 | 0 | 0 | 3 | 0 | 0 |
| 0.9 | 2 | 2 | 0 | 0 | 2 | 0 | 0 |
| 1   | 1 | 1 | 0 | 0 | 1 | 0 | 0 |

TABLE 1d

Capacitive functionality in dependence
of thickness of the first layer and surface
area of the second layer covering 50 cm² or 100 cm².

| Leather Thickness of first layer [mm] | Amount of Pieces Measured to Thickness | 50 cm² NW | 50 cm² BW | 50 cm² WO | 100 cm² NW | 100 cm² BW | 100 cm² WO |
|---|---|---|---|---|---|---|---|
| 0.1   | 3 | 0 | 0 | 3 | 0 | 0 | 3 |
| 0.125 | 2 | 0 | 0 | 2 | 0 | 0 | 2 |
| 0.15  | 1 | 0 | 0 | 1 | 0 | 0 | 1 |
| 0.175 | 2 | 0 | 0 | 2 | 0 | 0 | 2 |
| 0.2   | 3 | 0 | 0 | 3 | 0 | 0 | 3 |
| 0.225 | 1 | 0 | 0 | 1 | 0 | 0 | 1 |
| 0.25  | 3 | 0 | 0 | 3 | 0 | 0 | 3 |
| 0.3   | 4 | 0 | 0 | 4 | 0 | 0 | 4 |
| 0.325 | 1 | 0 | 0 | 1 | 0 | 0 | 1 |
| 0.4   | 4 | 0 | 0 | 4 | 0 | 0 | 4 |
| 0.5   | 4 | 0 | 0 | 3 | 0 | 0 | 3 |
| 0.6   | 3 | 2 | 1 | 0 | 2 | 1 | 0 |
| 0.7   | 4 | 4 | 0 | 0 | 4 | 0 | 0 |
| 0.8   | 3 | 2 | 1 | 0 | 2 | 1 | 0 |
| 0.9   | 2 | 2 | 0 | 0 | 2 | 0 | 0 |
| 1     | 1 | 1 | 0 | 0 | 1 | 0 | 0 |

Table 1a-1d show an overview of results of experiments for finding the minimum surface area, which is required for reliably operating a capacitive device being in above experiments a touch screen of a smartphone by Apple (i-Phone). More particularly, these tables 1a-1d show upper splits of different thicknesses, forming a sandwich structure with a conductive sheet as functional layer. The upper splits are of different types of leathers, those types being Goat Nappa, Goat Suede, Sheep Nappa, Sheep Suede, Deer Nappa, Deer Suede, and with different types of finishes, such as with and without coating. While not shown in the tables, it is assumed from experimentation that besides thickness, such factors as animal type, tanning process, current humidity level, structure of the particular piece of leather etc. determine the minimum area required. For example, the best performing top layer that enabled interaction, albeit unreliably, with the touch screen when the functional layer had at a surface area of only 1 cm² was a Deer Nappa. When the functional layer was increased to 2 cm², the same top layer already interacted reliably with the touch screen. Experiments with two pieces of Sheep Nappa used as the upper split leather or first layer at the same thickness of about 0.1 mm did not interact with the screen until the area was increased to 3 cm². Whether this difference was due to a difference in grain structure or a difference in tanning cannot be established within the confines of this application. However, this indicates that a minimum area of the conductive sheet required for a capacitive function can be reduced to an area of 1 cm², if at the same time the thickness of the first layer is selected through a thorough trial process and reduced to between 0.05 mm to 0.1 mm. However, the area of the finger-tip itself that is interacting with a touch screen for instance in swiping or zooming exceeds 1 cm², and the structural integrity of leather at such thicknesses is becoming increasingly poor.

As can also be seen from the table 1b, if the process can be controlled to yield first layers or upper split leathers at or below 0.25 mm, an embedded area of minimum 5 cm² will suffice to work reliably (see column "5 cm² WO" in table 1b), as 15 out of materials tested as first layer with a second layer of 5 cm² worked reliably. When the top or first layer measures less than 0.20 mm, and the second layer has a surface area of 3 cm² (see table 1b second to fifth column), the resulting leather product interacted with the screen eight out of eight times, seven of which reliably, and one time unreliably (see column borderline working BW).

As can further be seen from all tables 1a-1d, reliable interaction with a touch screen for first-layer thicknesses exceeding 0.5 mm are uncommon. Out of thirteen top layers, eleven did not interact with the screen at all even with a second layer made of conductive material with a surface measurement of 100 cm² present. In two instances was unreliable interaction possible. In one instance—out of three—at 0.6 mm in the first layer or upper split leather, a conductive surface area of 25 cm² in the second layer was sufficient for an unstable or borderline interaction with the screen (see Table 1c; column "25 cm² BW"). The functionality stayed unstable even when the surface area of the second layer material was increased to 100 cm² (see Table 1d; column 100 cm² BW). Likewise, in one instance—out of three—at 0.8 mm in the first layer or upper split leather, unstable interaction with a touch screen was present starting at 50 cm², which stayed unstable when the surface area of the second layer was increased to 100 cm².

Interestingly, in eight other cases ranging from 0.6 mm through 0.8 mm in the first layer, no interaction was enabled even with the second layer measuring 100 cm². It is noteworthy that all three instances where one upper split leather or first layer outperformed other first layers of the same or even greater thicknesses, the first layer was of the same base material, namely deer. It is noted that the experiments are only examples for the better understanding of the invention and illustrating the general rule that for working reliably the upper split leathers should not exceed a thickness of 0.5 mm and that increasing the surface area of the conductive sheet can be reduced if at the same time the thickness of the first layer is reduced. If the experiments would be performed with an electronic device of another manufacturer, slightly different results may occur, but the overall picture should remain the same.

Naturally, the maximum area possible is defined by the cumulative surface area of the cut piece worked into a glove. However, there is also the possibility that the functional layer is folded to increase the surface area without increasing the surface area of the first layer. In this configuration, an insulating layer between the folded and overlapping regions of the conductive sheet should be provided.

The term "embedded" is used in this disclosure if a sandwich structure of at least three layers or more is provided and a conductive sheet is embedded between the upper and lower split leather.

The capacitive function of the inventive leather product works as follows:

In contrast to usual touch screen operation, which works with touching a capacitive device with a conductor such as a bare finger, the present invention works with a first split leather layer which acts as a dielectric and is a very poor conductor of electricity or is nonconductive. According to an embodiment the outer surface of the upper split leather and/or the lower split leather has a surface resistivity of equal to or greater than $10^9$ Ohms per square.

It is noted that when a surface resistivity of $10^{10}$ Ohms per square of the upper and lower split leathers have been measured, a moisture content of 14% in the leather was measured. As known, the moisture content of leather can vary and with increasing moisture the surface resistivity would decrease. Since the surface resistivity values of the plain leather as well as the outer surface leathers of the sandwich structure was measured to be more than $10^{10}$ Ohms per square it approaches or reaches values of an insulative material, which has a surface resistivity of at least $10^{12}$ Ohms per square.

However, the upper split leather or first layer of the sandwich structure needs to be sufficiently thin i.e. between 0.05 to 0.45 mm, preferably 0.15 to 0.35 mm, and preferably have a minimum of variation of +/−0.05 mm, so that operation is reliable. Below said thin first layer or upper leather split, a highly electrically conductive silicone sheet is positioned. This electrically conductive functional layer facilitates the formation of dynamic capacitance and can alter the electrostatic field such that a change in capacitance can be detected by the touch screen device. These changes can then be translated within the electronic device to positional information for the screen.

According to a preferred embodiment of the leather product with a capacitive function, the conductive silicon sheet or conductive rubber sheet or other conductive sheet has a surface resistivity of less 1000 Ohm per square, preferably less than 200 Ohm per square, more preferably equal or less than 180 Ohm per square and a corresponding volume resistivity of less than 24 Ohm cm or 5 Ohm cm, respectively, whereby the overall thickness is preferably about 0.2 mm or less. An example of values of a suited conductive sheet would be 180 Ohm per square and 4.3 Ohm-cm. The volume resistivity and surface resistivity may be tested in accordance with standard methods of the International Electrotechnical Commission such as IEC 60093 (Methods of test for volume resistivity and surface resistivity of solid electrical insulating materials; issued 15 Feb. 2006).

Alternative materials or shapes of the conductive sheets can be used as long as they are conductive and fulfil the resistivity ranges mentioned above. Such alternatives may be polymeric, metal mesh or other conductive materials formed as a sheet or other three-dimensional structures.

Thus it is the presence of the electrically conductive sheet that
(i) facilitates the formation of dynamic capacitance and/or
(ii) alters the electrostatic field and/or
(iii) facilitates a change in capacitance.

It is understood that this is in order to facilitate a similar level of (dynamic) capacitance as is created when using a human fingertip to operate a touch screen. This level of capacitance has been measured to be of a required minimum level of between about 10 to 15 picofarads.

According to a preferred embodiment of the functional leather product the conductive silicon sheet or conductive rubber sheet is a carbon filled material having a surface resistivity of less than 200 Ohm per square and/or a volume resistivity of less than 5 Ohm-cm.

Such thin electrically conductive silicon sheet having a thickness of 0.2 mm, 0.5 mm, 0.8 mm, 1.0 mm, 1.5 mm or 2 mm are commercially available and may use as suitable conductive agent carbon. According to the invention the thinnest available overall thickness of about 0.2 mm or less is preferred.

According to a preferred embodiment of the functional leather product the attachment means are selected from the attachment means comprising: stitch bonding, an adhesive, a solvent-based adhesive, a polyurethane resin adhesive, an acrylic resin adhesive, polyester resin a polyamide resin, a silicone-based adhesive, a rubber based adhesive, a water-based adhesive, adhesive cross filament tape or combinations thereof. In other examples, the attachment means may be any type of fastener, such as buckles, buttons, hooks, snaps, or any other suitable fastener. Combinations of any suitable attachment means may also be used.

According to a further embodiment of the functional leather product the adhesive is deposited at least partially on the surface of at least one of the first layer and third layer in order to laminate the functional layer by using a bonding layer to at least one of the first and third layer; wherein the adhesive of the bonding layer is flexible and/or repositionable and optionally comprises an active agent selected from the group consisting of a perfuming composition, a deodorizing composition, an aroma agent, an insecticidal substance, an antimicrobial substance, a virucidal substance, a bactericidal substance or combinations thereof.

By using for laminating the sandwich structure an adhesive with an antimicrobial substance as e.g. chlorhexidine or salts thereof and thereby forming a continuous adhesive bonding layer, said bonding layer can be used as a barrier or protection against harmful substances and/or bacteria and/or viruses.

In another aspect, the present disclosure is directed to a method for producing a functional leather product for a glove having a capacitive and/or perceptible and/or protective function, comprising the following steps:
obtaining a first layer in form of an upper split leather by splitting at least a portion of a cut piece leather at a predetermined cross-sectional depth of maximum 4.95 mm using a splitting machine; and attaching a second layer in form of a functional layer at least partially to the upper split leather by attachment means to form a two layered sandwich structure.

According to a preferred embodiment of the disclosure the method step of splitting further comprises obtaining from said cut piece of leather a third layer in form of a lower split leather; wherein the first layer has a maximum thickness of about 0.5 mm; preferably 0.4 mm, and the second and functional layer is a conductive silicon sheet or a conductive rubber sheet having an area of at least approximately 50 cm$^2$, or at least approximately at least 25 cm$^2$, wherein the minimum surface area can be reduced if the thickness of the first layer is reduced.

Further the method comprises after splitting arranging the functional layer between at least a portion of the lower split leather and the upper split layer such that at least a portion thereof is arranged in the finger portion of the glove for use with a capacitive touch screen; and wherein attaching comprises further attaching the lower split leather by attachment means at least partially to the functional layer to form a three-layered sandwich structure. The minimum surface area of the conductive sheet depends on the thickness of the first layer, wherein smaller areas of about 5 cm$^2$ are possible for splits that are maximum 0.2 mm thick, and in some instances areas of 1 cm$^2$ would suffice where the thickness of the split is measured to be between 0.05 and 0.1 mm thick, whereas larger areas of minimum 50 cm² are necessary if thickness increases up to the maximum value of 0.50 mm.

Moreover, if the adhesive is designed as a functional adhesive the method further comprises mixing the adhesive before laminating with an active agent selected from the group consisting of a perfuming composition, a deodorizing composition, an aroma agent, an insecticidal substance and a bactericidal substance.

According to a preferred embodiment of the method, the method step of attaching comprises laminating using an adhesive and the following method steps:

laminating to the opposing surfaces of the two first and third layer the adhesive and thereafter pressing at least the laminated portions at a predetermined pressure for a predetermined period of time of less or equal to 24 hours; and, after curing, cutting out a predetermined contour of one or more glove component selected from a group comprising:

palm section, section to enclose four fingers, thumb section, cuff, sleeve and combinations thereof, and optionally prior to laminating the first and/or third layer is subject to a compressive force in order to produce the thickness of the first and/or third layer such that the thickness of the sandwich structure of the final leather product is equal to or less than the thickness of the original cut piece.

By applying pressure, the adhesive bond can be enhanced. Once laminated, pressed, and fully cured, the sandwich structure is well prepared to be further cut in smaller pieces than the original cut piece of specific geometry. Said smaller piece are typically common work pieces suited for glove making. In order to cut palm side work pieces or thumb work pieces or other common work pieces of gloves, cutting dies, machine operated cutting knives, or laser cutting techniques may be used.

By optionally pressing one or more of the split leathers the thickness of the final leather product can be reduced. That is to say that the functionality of the glove can be improved without increasing the thickness of the final leather product, and thus the glove.

It is noted that according to a preferred method of the disclosure the method comprises prior to the attaching process of an upper or lower split leather using laminating, for instance an upper split or lower split layer made of e.g. a corium layer may be subject to a compressive force by using a press in order to reduce its thickness, such that the thickness of the final sandwich structure is equal to or less than the sum of the thickness of the original cut piece leather and the electrically conductive silicone sheet. Accordingly, the final leather glove comprising at least partially a sandwich structure has a similar feel as a normal leather glove without a sandwich structure. Especially if the leather was only partially split, it is advantageous that the thickness of the portion of the sandwich structure has approximately the same thickness as the remaining unsplit portion, in order to not have abrupt boundaries in between.

According to a preferred embodiment of the method comprises further the following method steps:

prior to splitting, cutting into at least one elongated edge of the leather to provide a distance indicator; providing a line marking arranged perpendicular to the longitudinal axis of a feed table of the splitting machine; moving the leather using a feed device along an operational axis, which is parallel to the longitudinal axis of the feed table, towards the splitting device of the splitting machine; and turn off the feed device when the distance indicator reaches the line marking in order to provide a partially split leather.

In this way partially split leather can be provided. This can be advantageously used if the sandwich structure shall only be provided e.g. in the finger portion of a leather glove.

BRIEF DESCRIPTION OF THE FIGURES

Various features and advantages of the invention will be set forth in part in the following description referring to various examples of the invention. In this description reference is made to the accompanying drawings, in which:

FIG. 3a-c shows cross-sections of three embodiments of partially split cut pieces, wherein FIG. 3b shows an embodiment wherein part of the lower split is cut off and replaced by an equally dimensioned functional layer;

FIG. 3d-f shows the cross-sections of partially split cut pieces with an additional second layer or functional layer arranged below the first layer;

FIG. 3g-h show further alternative embodiments of partially split leather with an additional layer arranged below at least a portion of the second layer (FIG. 3g) or the entire second layer (FIG. 3h) to form a three layered sandwich structure after laminating.

FIG. 10a shows a perspective view of a splitting machine for partial splitting a cut piece of leather;

FIG. 10b shows a cross-sectional detailed view of the splitting machine of FIG. 10a;

FIG. 12 shows an embodiment of a cutting die for a glove thumb component including back and front piece and a three layered sandwich structure of a fully split cut piece of leather;

FIG. 13 shows a perspective view of a thumb piece of a fully split cut piece of leather obtained with the cutting die of FIG. 12, wherein the functional layer is only positioned in the end region of the thumb;

FIG. 14 shows another embodiment of a thumb piece which shows the part intended for the front thumb area and a partial functional layer;

FIG. 20a shows a cutting die for a back-component of a glove and a fully split cut piece of leather with a functional layer made of rubber or foam material and having a three-dimensional component for the back side of the glove;

FIG. 20b shows a perspective view of the three-dimensional component of FIG. 20a;

DETAILED DESCRIPTION OF THE FIGURES

Figure 1:
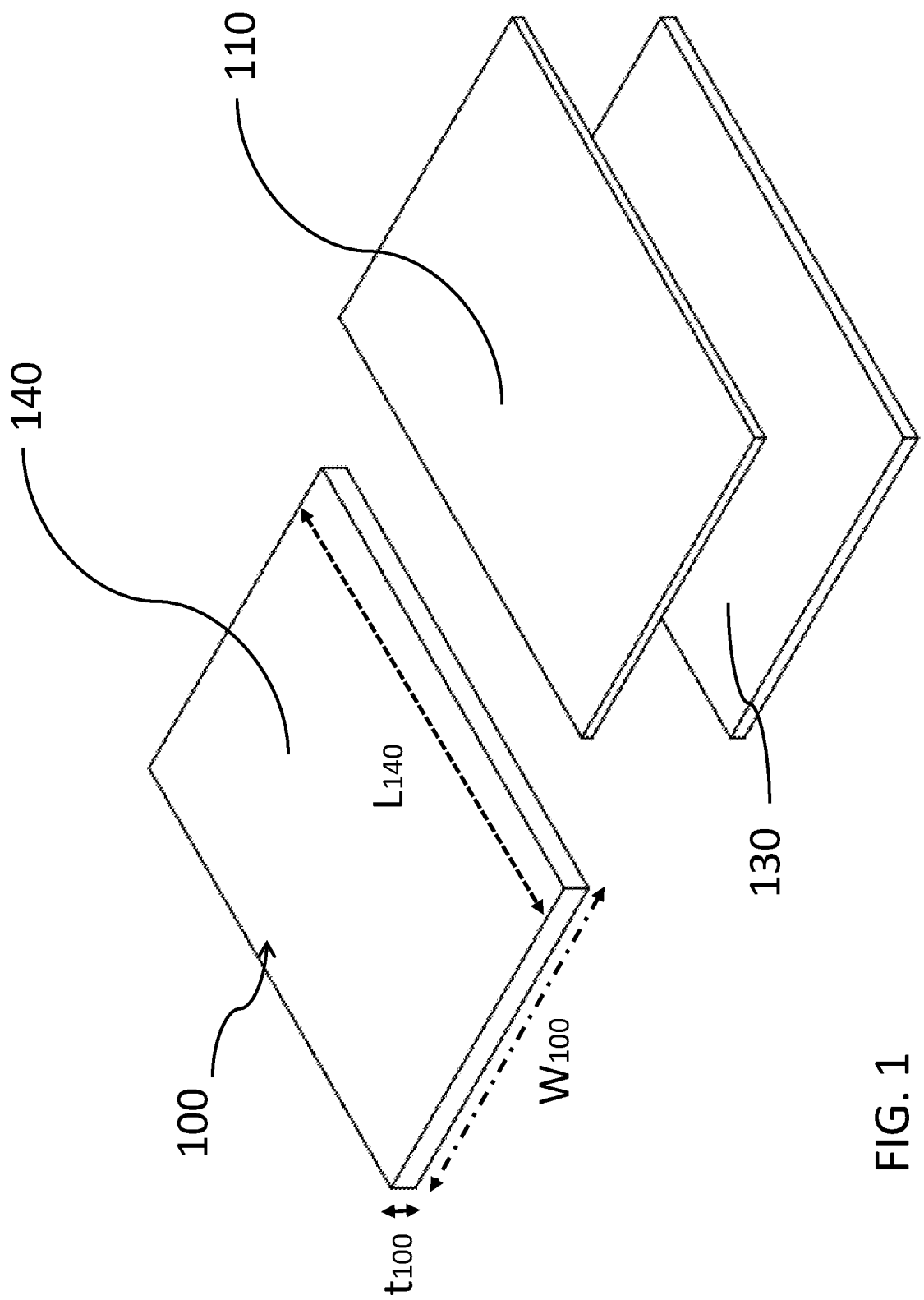
FIG. 1 is a three-dimensional view of a cut piece of leather prior and after splitting the entire area of the original unsplit cut piece of leather.

FIG. 1 is a three-dimensional view of a cut piece of leather prior and after splitting the entire area of the original unsplit cut piece of leather. The thickness $t_{100}$ of the shown unsplit leather is about 0.7 mm+/−0.05 mm. Other thicknesses can be selected depending of the kind of leather. Smaller thicknesses too than shown in FIG. 1 are also conceivable as long as the thickness is sufficient to split the cut piece into an upper and lower split leather. In general, if the leather is genuine leather 140 the thickness may vary from below 0.3 mm to maximum about 5 mm or 4.95 mm, more typically for the field of invention between 0.4 mm and 0.8 mm.

The width $W_{100}$ of the shown example of the cut piece is for instance 100 mm. Other widths of typical cut pieces for glove components can also be used and depend on style and category (Children, Female or Male) of the final glove as well as the type of layout (classic/French one piece or two piece layout, Guncut, Lobster Glove, etc.) and the work piece thereof, such as thumb or palm component, fourchettes, etc. The widths $W_{100}$ of palm work pieces may range for instance between 75 mm and 150 mm for two piece cutting knives and between 150 mm and 300 mm for one piece cutting knives.

The length $L_{140}$ in the exemplary embodiment is about 250 mm. Other common lengths of the cut piece 100 can be selected from the range of 100 to 800 mm, preferably 200 mm to 400 mm as long as they are suited for glove or gauntlet work pieces.

The right hand side shows a perspective view after the splitting process. The splitting results in two layers:
  i) the upper split leather (first layer 110); and
  ii) the lower split leather (third layer 130).

Figure 2:
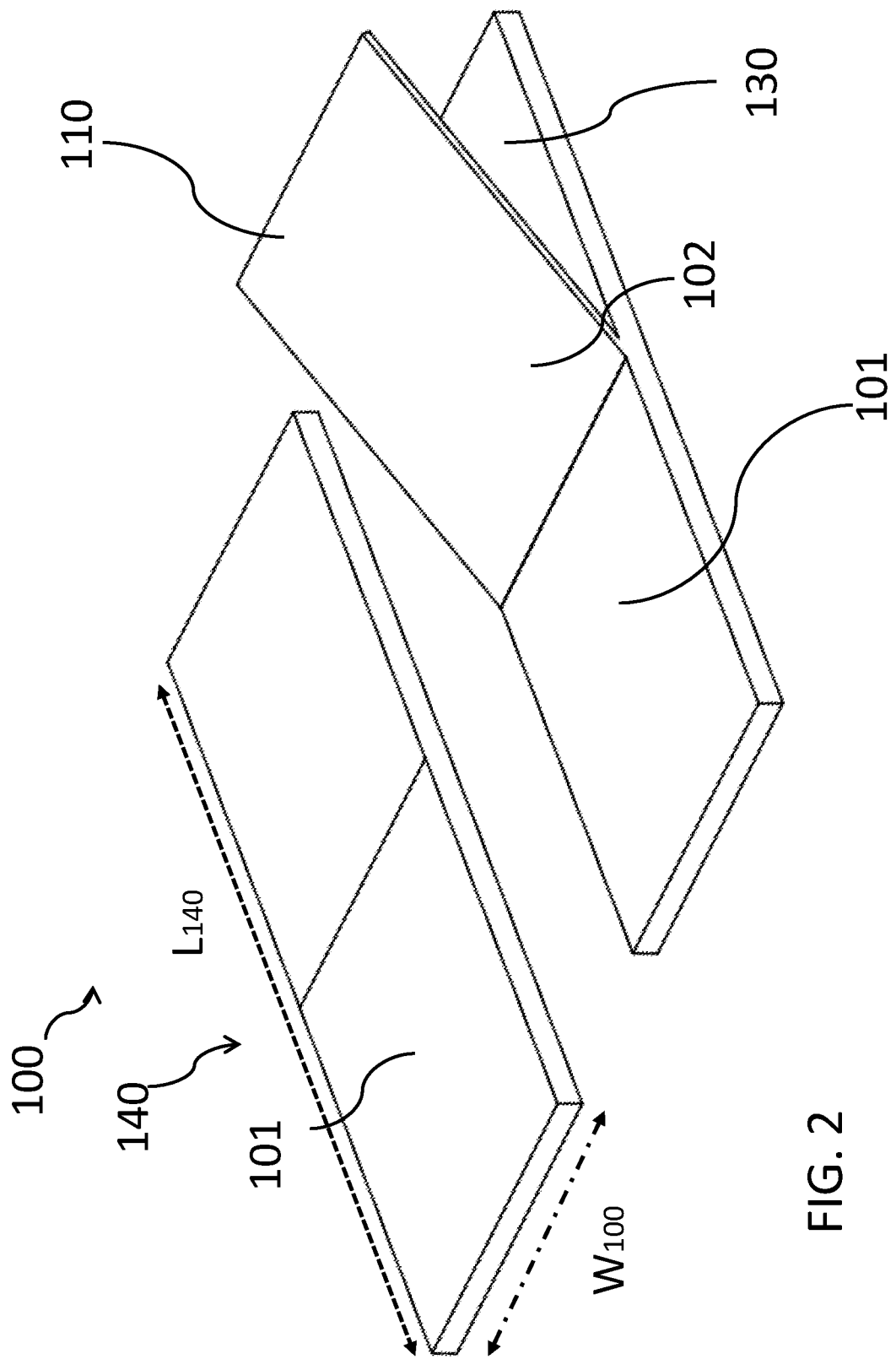
FIG. 2 is a three dimensional illustration of a cut piece of genuine leather prior and after partially splitting.

FIG. 2 shows a three dimensional illustration of another rectangular cut piece with a width $W_{100}$ measuring about 120 mm and a length $L_{140}$ of about 310 mm. The cut piece 100 has been pre-cut to a specific geometry from a hide of genuine leather 140 or leather like material accommodating a typical palm work piece of classic/French layout for a glove.

FIG. 2 shows on the right hand side a partially split cut piece 100, wherein the splitting process has been conducted to only split a portion 102 of the cut piece 100 into two split leathers (110, 130). The remaining unsplit portion 101 extends about the half of the length $L_{140}$ of the original cut piece 100 and stays intact.

It is noted that not only genuine leathers may be partially split but also leather-like material as defined in the introduction of this application.

FIG. 3a-c shows cross-sections of three embodiments of partially split cut pieces of leather or leather-like material. After splitting a portion 102 into an upper split leather 110 and a lower split leather 130 several embodiments are feasible. FIG. 3a shows an embodiment, wherein the splits 110 and 130 have about the same longitudinal dimensions. FIG. 3b shows another embodiment wherein the lower split leather 130 is shorter than the upper split leather 110 or first layer, after a part has been cut off. Further, FIG. 3b shows besides the partially split and shortened lower split leather 110 a functional sheet 120. The thickness of said lower split leather 130 is equal to the thickness of the functional layer 120. Accordingly, this embodiment is configured such that the part of the lower split leather, which has been cut off (not shown in FIG. 3b) is replaced by the functional layer 120. In this way the leather product 150 has an even and homogenous thickness throughout the entire longitudinal extension. FIG. 3c shows an embodiment wherein the lower split leather has been completely cut off. As in FIG. 3b this cut off portion may also be replaced by a functional layer of same thickness (not shown). Further embodiments of similarly partially split cut pieces and further comprising functional layers are illustrated in the following FIG. 3d-3h.

FIG. 3d-f shows the cross-sections of the embodiments of FIG. 3a-c with an additional second layer 120 or functional layer arranged below the first layer 110. FIG. 3d results after laminating the leathers 110, 130 of the split portion 102 with the functional layer 120 in-between in a three layered sandwich structure.

FIG. 3e shows an embodiment wherein the lower split 130 is shortened about a half and thus the functional layer 120 forms with the first layer 110 after laminating a two layered sandwich structure at the outer region of the final leather product. It is noted that this functional layer will be in the inside of the final glove and the entire first layer stays intact at the outside, in order to maintain at least from the outside the appearance and feel of a typical leather glove.

FIG. 3f shows an embodiment of a partially split leather as shown in FIG. 3c, comprising an unsplit portion 101 and a second and functional layer 120 arranged in the split portion 102. Said split portion 102 is configured to form a two layered sandwich structure after laminating. After assembling the glove components this functional layer 120 will be in the inside of the glove and the outer surface of the glove will be characterized by a continuous leather surface made of the outer surface of the unsplit portion 101 and the upper split leather 110.

In the embodiment of FIG. 3g in addition to and in the height of the lower split leather 130 a fourth layer 144 is provided to produce a third layer made of the lower split leather 130 and the fourth layer 144. The fourth layer 144 may be a further functional layer, which has another function as the functional layer 120. For instance, the functional layer 120 may be a conductive sheet whereas the forth layer 144 may be an antimicrobial sheet or a reinforcement sheet.

In the embodiment of FIG. 3h comprising a fourth layer, said fourth layer 144 is positioned below the entire second layer 120 and thus replaces the former lower split leather 130.

By using the fourth layer 144 as shown in FIGS. 3g and 3h other sheet-like materials can be added such as linings, insulation, cushioning products or a combination of said inner layers, which are suitable for a glove.

Figure 4A:
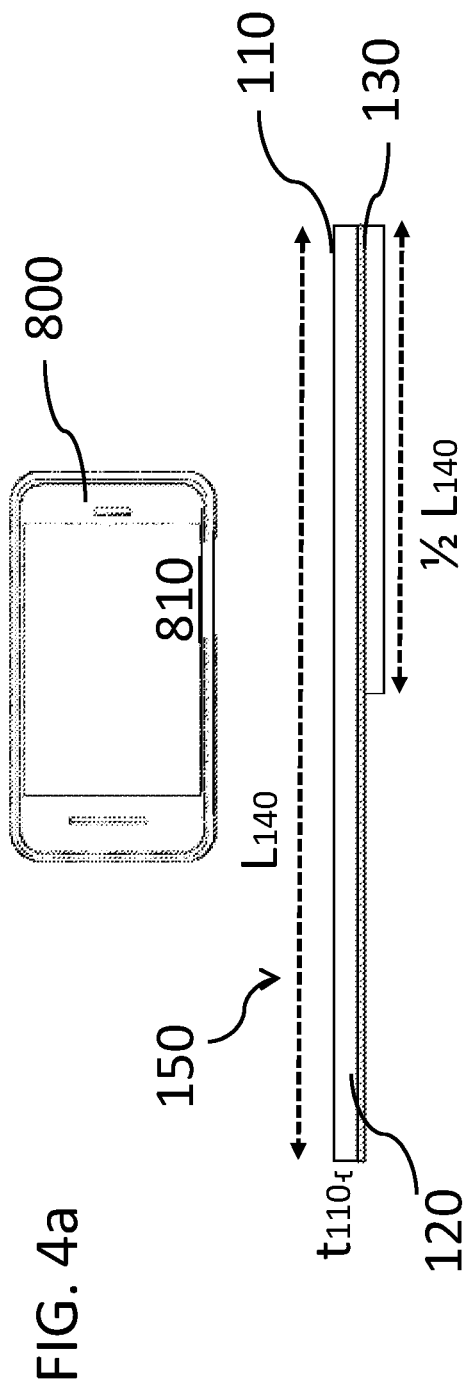
FIG. 4a-c are cross-sectional schematic views of embodiments with a completely split cut piece of leather and comprising at least partially a three layered sandwich structure.
Figure 4B:
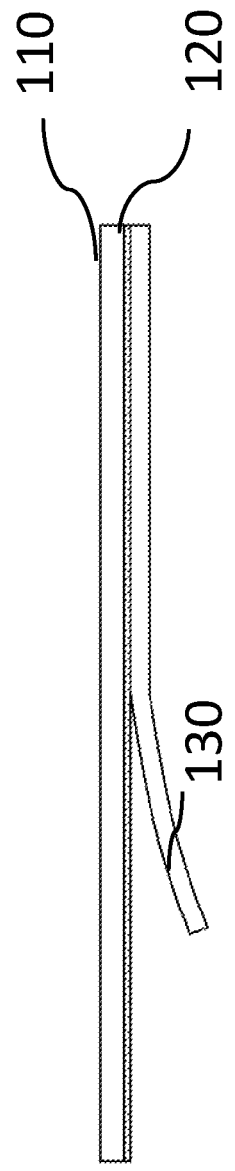
Figure 4C:
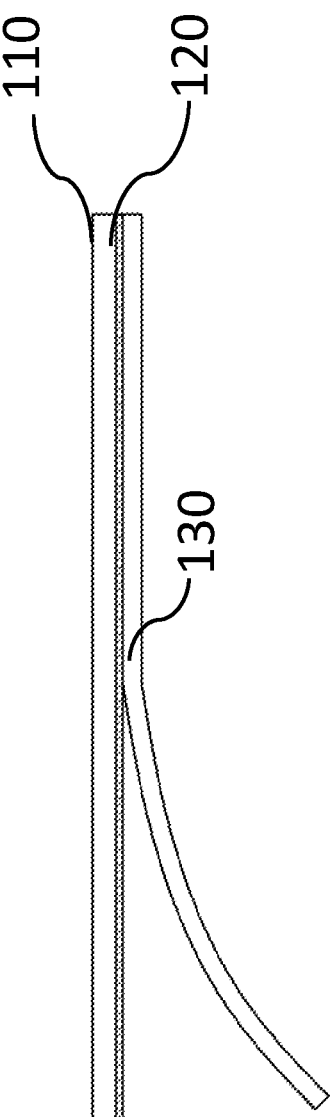

FIG. 4a-c are cross-sectional schematic views of embodiments with a completely split cut piece of leather and comprising at least partially a three-layered sandwich structure. In this way over the entire surface of the final leather product 150 the desired functionality can be provided. The second layer can be selected from a group of functional layers comprising:

a conductive sheet, a reinforcement sheet, an abrasive resistant layer, a three-dimensional layer with elevated or depressed structures relative to said thickness, an antimicrobial, antibacterial and/or antiviral sheet, a water-resistant membrane, a heat or flame resistant layer, a flexible near field communication device or combinations thereof. Combinations can be either provided either in the same height i.e. juxtaposed or on top of each other. Other configurations are possible, as long as the conductive sheet is arranged below the top or first layer in order to ensure a capacitive function with a capacitive device 800.

FIG. 4a and FIG. 4b show two variations of a fully split cut piece of leather or leather-like materials with the dimensions $L_{140}$ and $W_{100}$, wherein the lower split leather 130 has been cut to an extension of about half the length (FIG. 4a) of the original length $L_{140}$ of the upper split leather 110. FIG. 4a shows further schematically an electronic input device 800 with a capacitive touch screen 810. After the leather product 150 is assembled to a glove (not shown) the upper split leather layer 110 is arranged at the outside of the glove and an electronic input device 800 can be used if a finger covered by the leather product touches the touch screen 810 with the substantially non-conductive upper spilt leather 110.

It is important for the capacitive function of the leather product 150 that the thickness $t_{110}$ of the first layer 110 on top of the functional layer 120 should not surpass 0.50 mm, preferably at or below 0.35 mm, to work most reliably. In contrast, the thickness of a conductive functional layer 120 below the first layer or upper split leather 110 can have a greater thickness than the upper split leather 110 or first layer. However, in the shown embodiment the thickness of the functional layer 120 is thinner than the upper split leather 110. A preferred thickness is for instance about 0.2 mm. Providing a functional layer 120, that is as thin as possible, has the advantage that the flexibility and feel of at least the upper layer 110 of the final leather product 150 (once the complete third layer 130 is laminated as shown in FIG. 4a) is similar to a normal leather glove. Thus the leather product 150 is not only in the region of the two-layered sandwich structure (left hand side in FIG. 4a and FIG. 4b) flexible as a unsplit leather piece but also in the region of the three layered sandwich structure (right hand side in FIG. 4a and FIG. 4b and entire extension of the leather product 150 of FIG. 4c).

Figure 5:
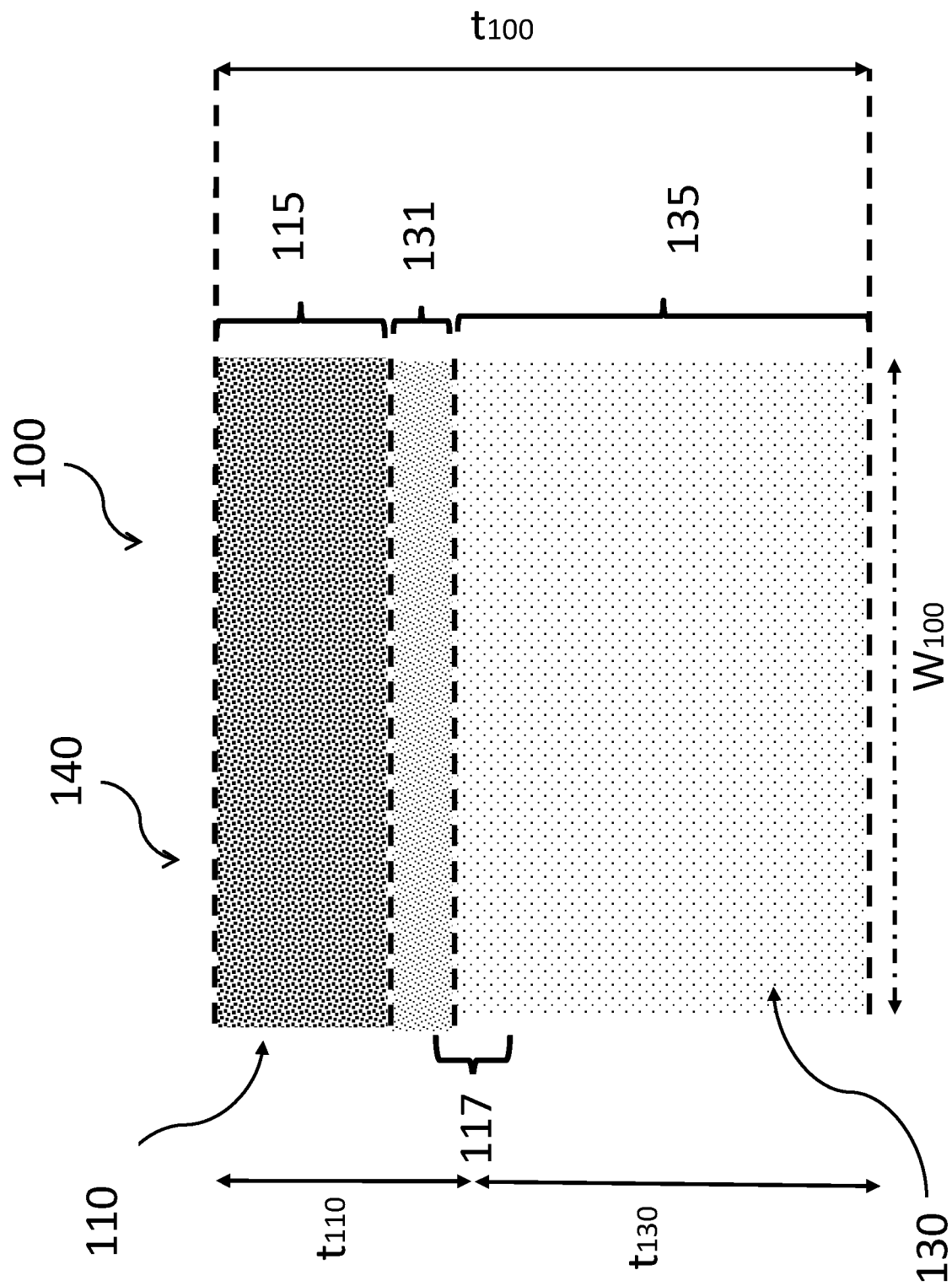
FIG. 5 is a cross-sectional schematic view, greatly enlarged, of genuine leather having a grain and a corium layer.

FIG. 5 is a cross-sectional schematic view of genuine leather 140 having a grain layer 115 and a corium layer 135, which is greatly enlarged. Said leather has usually been chemically treated with a common tanning practice. The genuine leather is a cut piece 100 from hides or skins having a width $W_{100}$. Hides are usually large in size and thicker in substance than skin and can be selected for instance from cowhide, buffalo hide or horsehide. Commonly known skins can be for example a goatskin, a sheepskin or a hairsheep skin. The naturally existing structurally distinct layers (115, 131 and 135) of leather, wherein the upper layer 115 has not yet been physically altered beyond hair removal, are schematically shown with different patterns. The grain layer 115 is the uppermost layer and originally closest to the outer surface of the animal as for example cow leather. Said grain layer is substantially composed of a plurality of interwoven and fine collagen fibres of diameters less than 5 μm. The corium layer 135 beneath the grain layer has a felt-work of thicker bundles of fibers, which typically extend to a maximum diameter of about 100 μm. The boundary between these two layers is not precise and there is junction zone 131, which constitutes the grain-corium boundary. In this junction zone 131 the collagen fibers progressively increase in thickness from less than 5 μm to a maximum of about 100μm.

The upper split leather 110 and the lower split leather 130 are obtained by splitting parallel to the surface at or below the cross-sectional depth of the junction zone 131, wherein below is in an upper portion of corium layer 135 of the genuine leather. Splitting a cut piece 100 in the splitting region 117 as shown in FIG. 5 results into an upper split leather 110 of a thickness $t_{110}$ and a lower split leather 130 of a thickness $t_{130}$. However, other cross-sectional depths to split the cut piece 100 of the thickness $t_{130}$ can be chosen and would result in other thicknesses.

Figure 6:
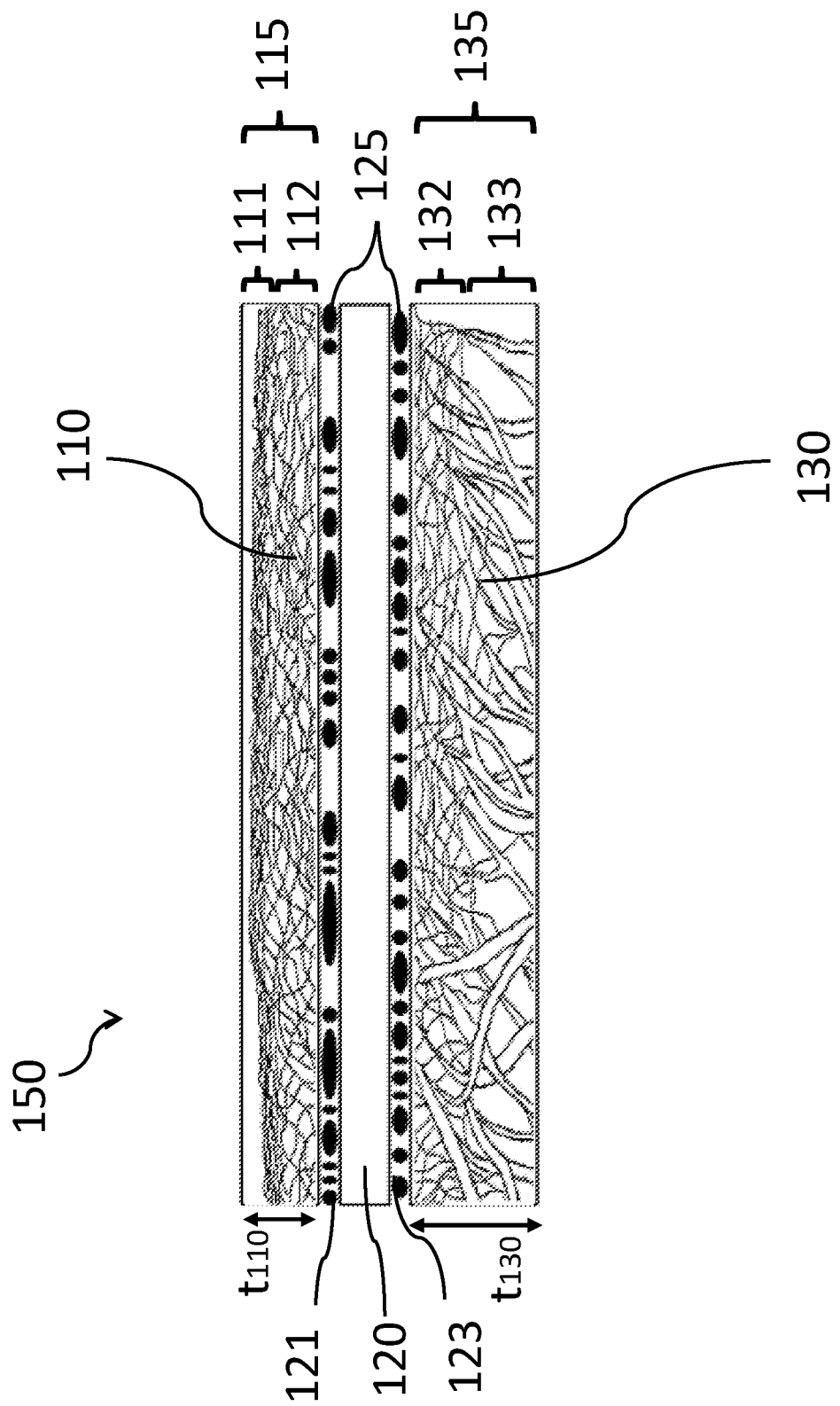
FIG. 6 is a cross-sectional schematic view of a functional leather product, which is obtained by splitting a full-grain leather and then laminating between the upper and lower split leathers a functional layer.

FIG. 6 is a cross-sectional schematic view of an exemplary embodiment of a functional leather product 150, which is obtained by first splitting a cut piece of full-grain leather as shown e.g. in FIG. 5. The full grain leather has a grain layer 115 including an outer grain layer 111 and a lower grain layer 112 having a thickness $t_{110}$, which can be 0.40+/−0.05 mm or less if a capacitive function of the final leather product 150 is desired. Further the corium layer 135 comprises an upper corium layer 132 and a lower corium layer 133, wherein the thickness $t_{130}$ of the corium layer 135 1 is greater than $t_{110}$. The splitting produces an upper split leather 110 including the grain layer 115 and a lower split leather 130 comprising the corium layer 135.

After splitting a functional layer 120 made from a preformed conductive silicone sheet material and cut to an appropriate size and shape depending on the size of the cut piece 100 of leather, is situated (sandwiched) between the two split leathers 110 and 130. The laminating step adheres the two split leathers 110 and 130 or first and third layer using a suitable adhesive 125 (e.g. a solvent-based, flexible, repositionable adhesive) to form a laminate. It is noted that the adhesive and thus the bonding layers 121 and 123 between the split leathers and the functional layer 120 are both non-conductive. As schematically shown the bonding layers 121 and 123 are discontinuous such that a partial coverage of the adjacent surfaces of the split leather (110 or 130) and functional layer 120 are sufficient for a secure attachment. The adhesive can be applied by numerous suitable ways as for example spraying or roller coating. Thus a laminated leather product 150 is formed that feels similar to the normal glove leather. Due to the conductive silicone sheet (functional layer 120) a three layered sandwich structure is formed, which if positioned in the areas of the fingers or thumb of a glove can facilitate the operation of a capacitive input device such as a touch screen.

A preferred electrically conductive sheet can be made of silicone and uses carbon as conductive material. Typical properties of a silicone sheet are a surface resistivity of less than 1000 Ohm per square preferably less than 200 Ohm per square and a corresponding volume resistivity of less than 24 Ohm cm and 5 Ohm cm, respectively, according to IEC 60093. The overall thickness can be chosen to be less or equal 0.2 mm and up to 10 mm. However, the lower end of the thickness range is preferred because the capacitive function is already present and thicker functional sheets alter the feel and flexibility of the final leather product.

Figure 7:
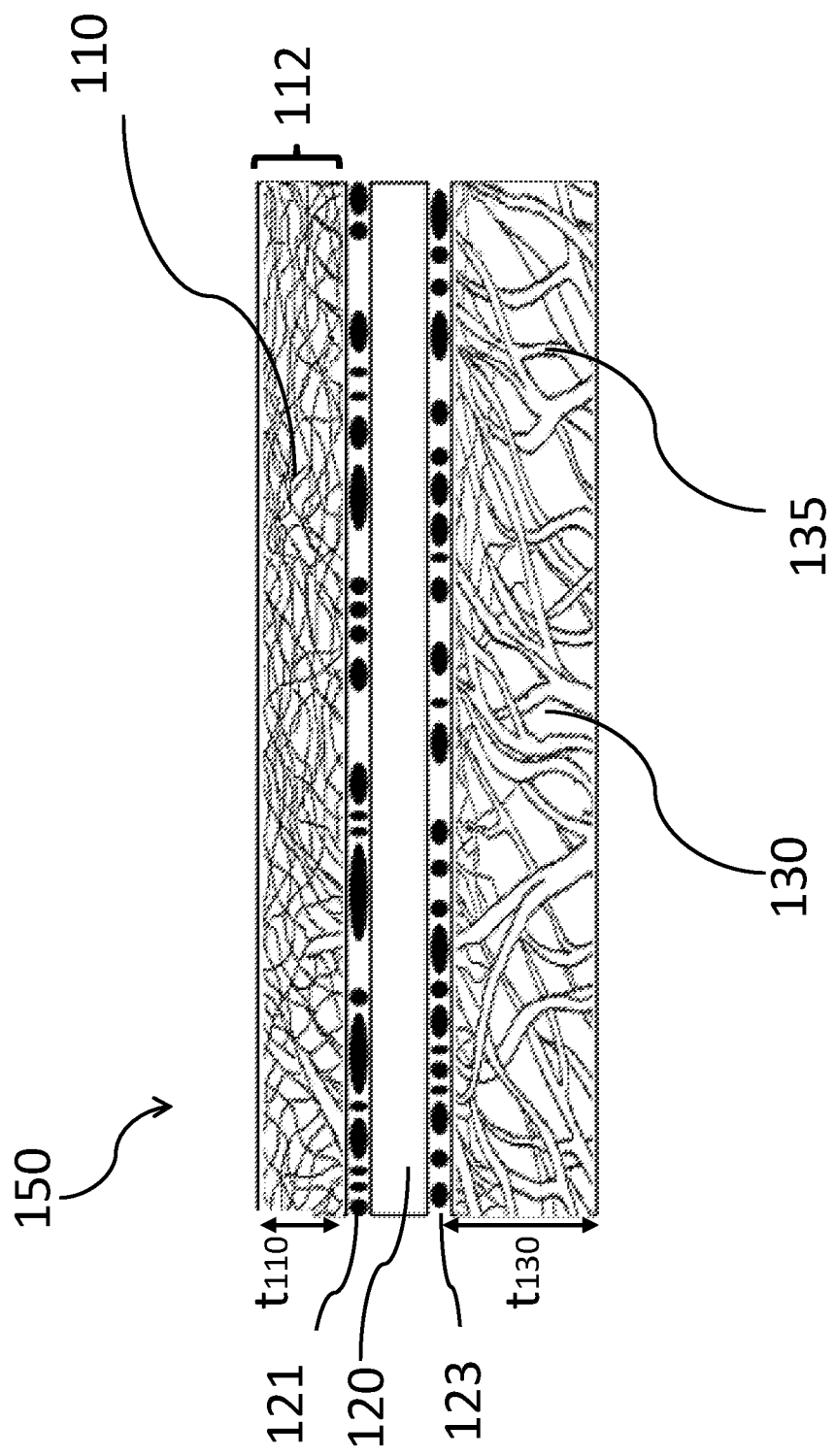
FIG. 7 is a cross-sectional schematic view of another embodiment of a functional leather product, wherein the upper and lower splits are obtained by splitting a nubuck leather (buffed grain)

FIG. 7 is a cross-sectional schematic view of another embodiment of a functional leather product 150, wherein the upper split leather 110 and lower split leather 130 are obtained by splitting a nubuck leather (buffed grain). Accordingly, the upper split leather 110 comprises only the lower grain layer 112. The lower split leather 130 comprises the entire lower corium layer 135. The first layer of the lower split leather 130, the second layer of the functional layer 120 and the third layer of the lower split leather 130 form after attaching the respective adjacent layers using adhesive bonding layers 121, 123 a three layered sandwich structure.

Figure 8:
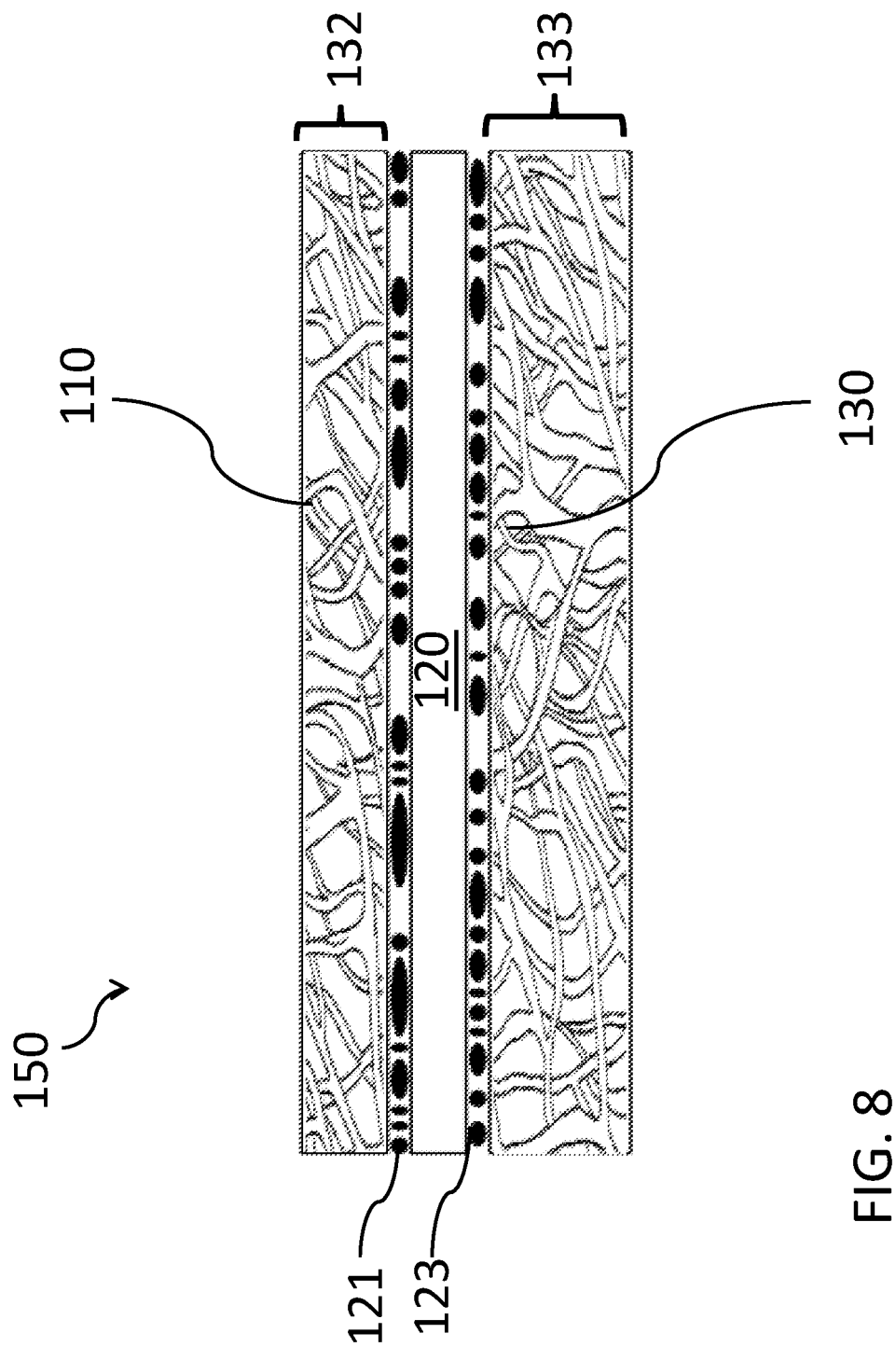
FIG. 8 is a cross-sectional schematic view according of another embodiment of the functional leather product, wherein the upper and lower splits are obtained by splitting suede comprising upper and lower corium layers.

FIG. 8 is a cross-sectional schematic view according to another embodiment of the functional leather product 150, wherein the cut piece 100 of leather is suede. Accordingly, there is substantially no grain layer in the unsplit leather piece, but only the corium layer. The splitting of suede results in an upper split 110 consisting of an upper corium layer and a lower split 130 of a lower corium layer. After attaching a functional layer 120 between the upper and lower splits 110, 130 using adhesive and corresponding bonding layers 121, 123 a functional leather product 150 is obtained comprising a three layered sandwich structure which feels like upper and lower corium layer at the respective outer sheet like surfaces.

Figure 9:
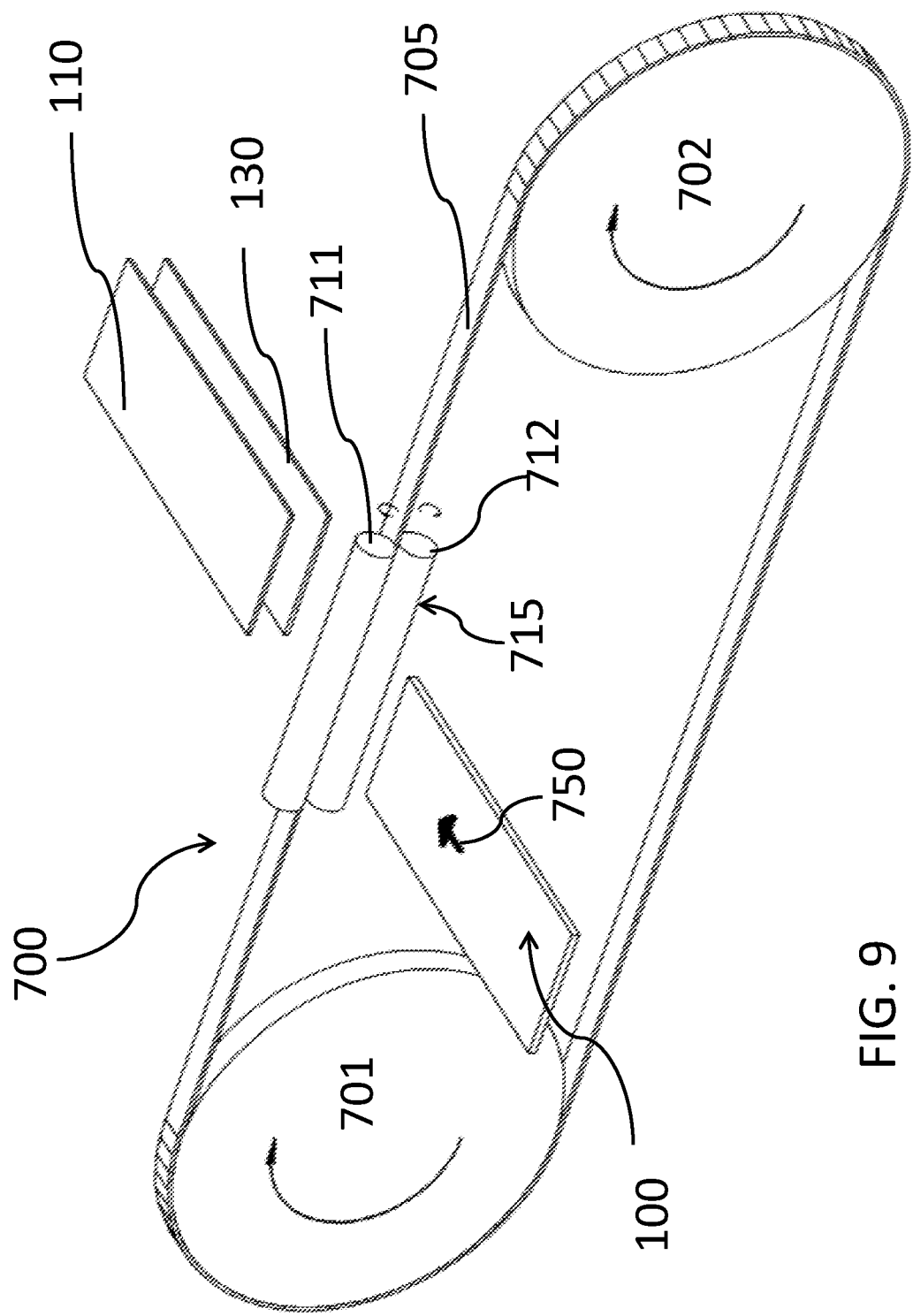
FIG. 9 shows a schematic perspective view of a splitting machine, wherein the entire cut piece or glove sized components can be split.

FIG. 9 shows a schematic perspective view of a leather splitting machine 700. FIG. 9 and the following FIGS. 10a and 10b show the basics of how a splitting machine 700 functions for splitting a glove size component. The figures show a band knife 705 which can be moved clockwise by the clockwise moving pulleys 701 and 702. For receiving a cut piece 100 the splitting machine 700 comprises feed pulleys 711 and 712. The cut piece 100 can be manually positioned between the feed pulleys 711, 712 in order to be moved along the operational axis 750 of the cut piece of leather or leather-like material. After the cut piece 100 has entered and then passed the band knife 705 of the splitting machine 700, the entire cut piece 100 of leather is split (shown in FIG. 9 schematically as explosive view on the right hand side of the band knife). In other words after the cut piece 100 of leather or leather-like material has passed the band knife 705 the resulting components (shown in explosive view) are the upper split leather 110 and the lower split leather 130.

Figure 10:
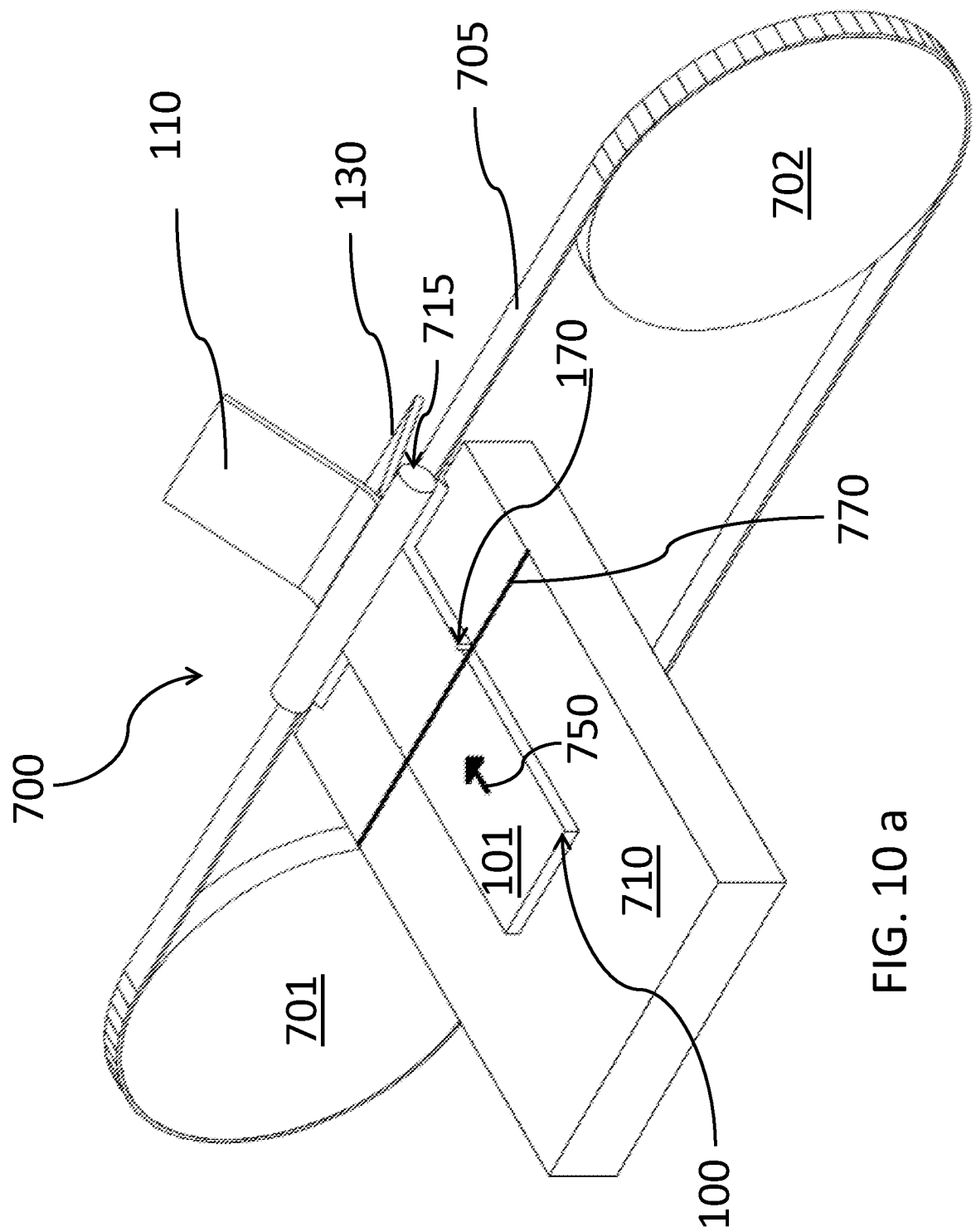
Figure 10B:
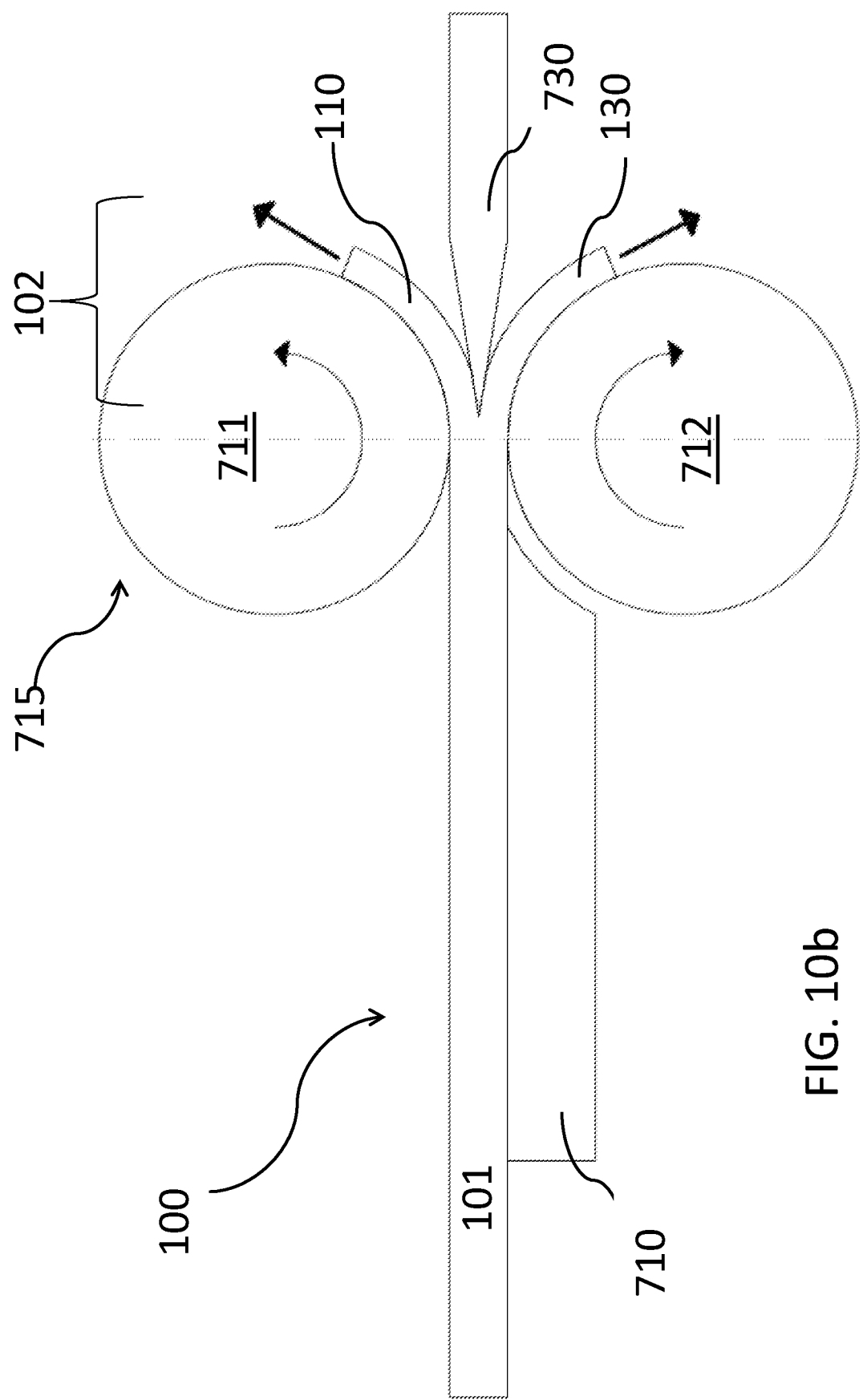

FIG. 10a shows a perspective view of a splitting machine 700 with a feed table 710. The cut piece 100 of genuine leather or leather-like material is sized for a glove component, such as a thumb component, for example. FIG. 10 shows the basics of how the splitting machine 700 functions for partial splitting of glove components or cut pieces 100 of leather. For partial splitting, an indicator 170 is provided to which the cut piece 100 of genuine leather or leather-like material should be split. The indicator 170 is a cutting edge in the leather. This indicator 170 is aligned with a line marking 770 on the feed table 710. It is noted that the line 770 marked on the feed table 710 is assisting to align with the distance indicator 170 which is cut into the glove size component which here could be e.g. a thumb component. The position of the marked line is calculated such that if the distance indicator 170, which is cut into the leather piece 100, meets the marking line 770 of the feed table 710, the splitting is stopped by disengaging the splitting mechanism of the machine 700.

The splitting by the band knife 705 results on the right hand side of the feed device 715 in an upper split leather 110 and a lower split leather 130. After the marked line 770 of the feed table 710 has been reached, and the splitting mechanism of the machine 700 has been disengaged, the partially split leather is removed from the feed device 715 and from the splitting machine 700. By using the distance indicator 170 cut into the glove size component or cut piece 100, the length of the partial split in the leather can be precisely controlled by a skilled machine operator. Thus, the length and dimension of the unsplit portion 101 can also be precisely controlled. The control is usually done manually but could also be automated, for instance by using a sensor measuring if the indicator 170 is passing the line marking 770.

FIG. 10b shows a cross section of the splitting machine 700 for partially splitting a cut piece of leather 100. The FIG. 10b only shows details as the feed table 710 and the feed pulleys 711 and 712. Further the splitting means 730 are shown in detail and maybe configured as a band cutter or band knife 705 as shown in the previous figures. The split portion 102 is comprised of the upper split leather 110 and the lower split leather 130.

Figure 11B:
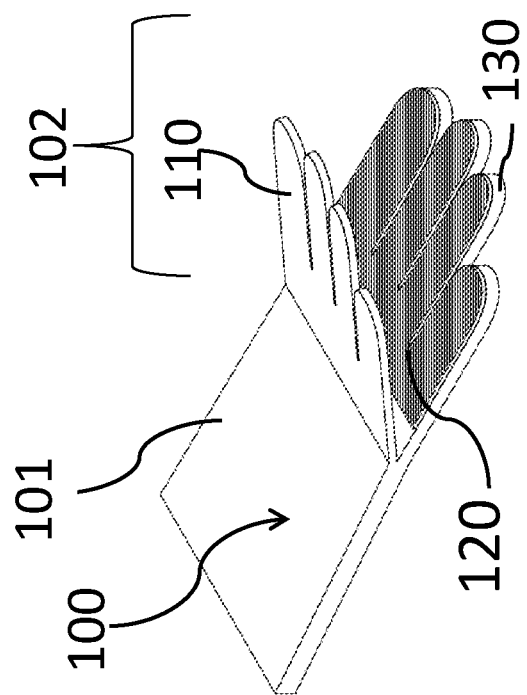
FIG. 11b shows a perspective view of a palm piece cut with the cutting die of FIG. 11a, wherein the functional layer is positioned over the majority of the split area.
Figure 11C:
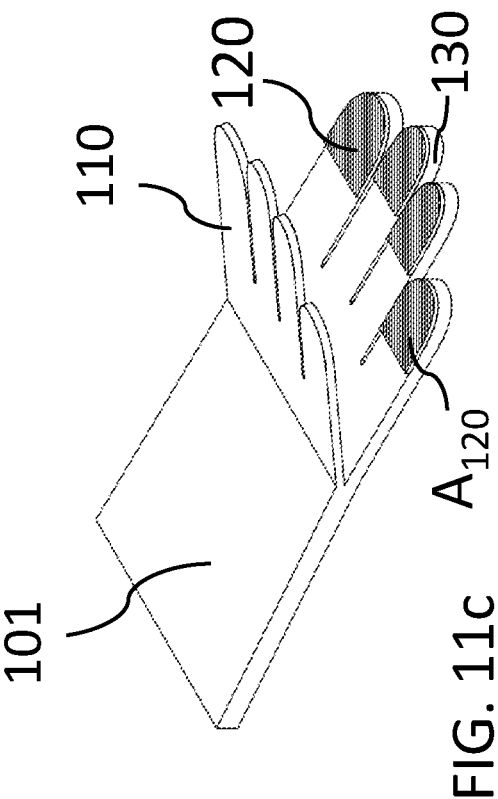
FIG. 11c shows another embodiment of a palm piece of a glove with a partial sandwich structure, wherein the functional layer is only positioned in the end regions of the fingers.
Figure 11A:
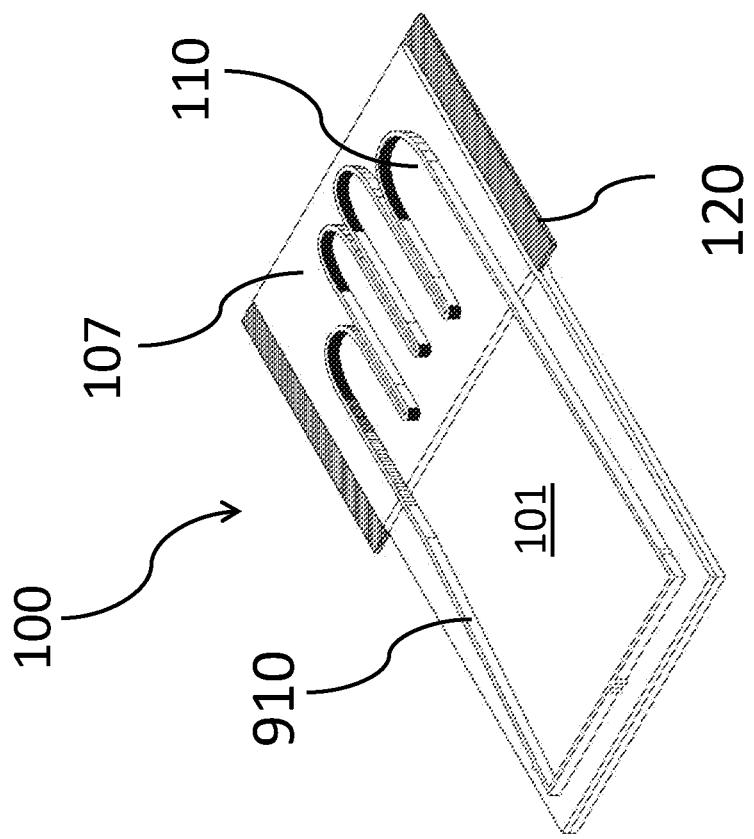
FIG. 11a shows a perspective view of a partially split cut piece of leather comprising a functional layer and a cutting die for glove palm component.

FIG. 11a shows a perspective view of a partially split cut piece 100 of leather comprising a functional layer 120 and a cutting die 910 for palm piece including fingers. FIG. 11a shows an unsplit portion 101. The top perspective view shows in the split region 102 the upper split leather 110. In the split portion 102 a functional layer 120 is positioned over the entire area. The area outside of the cutting die 910 for the palm piece and the fingers is cutting waste 107 and is removed after the cutting process using the cutting die 910 is completed.

FIG. 11b shows a glove component and cut piece 100 of leather after the cutting die 910 has been applied. In FIG.

11*b*, for better illustration, the upper split leather 110 in the split portion 102 is lifted in order to show the detailed position of the functional layer 120. In this embodiment, the functional layer 120 is positioned over the full length of the fingers of the final glove. The extension of the functional layer 120 along the longitudinal axis of the glove in direction to the unsplit region 101 is shorter than the length of the split portion 102 and shorter than the functional layer 120 as shown in FIG. 11*a*.

In FIG. 11*c* the length of the functional layer in the longitudinal direction of the fingers is even more reduced compared to FIG. 11*b* and the functional layer 120 is only positioned in the outer area of the fingers. This outer regions correspond to the finger tips once the glove is donned. Accordingly, if the functional layer 120 is for example a conductive sheet, the tip of a finger can cause a touch screen to recognize a glove touch and thus the final glove has a capacitive function. Alternatively, if the functional layer is an abrasive resistant layer or a reinforcement sheet, the functional glove can provide a better abrasive resistance in the areas of the finger tips.

The embodiments shown in the FIGS. 11*a*-11*c* are suitable to be used to activate a capacitive touch screen when the leather product is assembled as a glove. For these functional leather products it is especially important that the areas of the final glove, where the glove wearer touches a input device is provided with a three layered sandwich structure consisting of the upper split leather 110, a conductive functional layer 120 and the lower split leather 130.

It is noted with regard to FIG. 11*c* that the palm component shown can be assembled with the corresponding palm component for the outer hand (not shown) to obtain a final glove which appears as a leather glove of genuine leather. If a flexible thin functional layer is used, the finger glove once assembled does not show from the outside that there is partially a three layered sandwich structure, which consists for instance of a grain layer as upper split leather 110, functional layer 120 and corium layer as lower split leather 130. This functional sandwich structure is positioned approximately in the inner areas of the fingers in order to facilitate operation of a capacitive touch screen device and/or to improve abrasive resistance.

With regard to FIG. 11*c* the surface area $A_{120}$ of the functional layer is smaller than in the previous FIG. 11*c*. It is noted that for a capacitive function there is a minimum area required in dependence of the thickness of the first layer. For example if the thickness of the first layer 110 is 0.25 mm an embedded conductive second layer 120 of a minimum area $A_{120}$ of 8 cm$^2$ is sufficient to interact reliably with a capacitive device. At thicknesses of the first layer 110 of between 0.05 mm and 0.1 mm, surface areas as little as 3 cm$^2$, 2 cm$^2$, and even 1 cm$^2$ may suffice. In order to be able to minimize the surface area to a limited region as for instance to the finger tips and at the same time maintain the minimum required surface area of the conductive sheet, the functional layer may be folded (not shown in FIG. 11*c*) to increase the total surface area. In this way the portion of the surface area of the functional layer 120 facing the upper leather 110 can be maintained to e.g. 4 cm$^2$, whereas the total surface area can be increased e.g. doubled to 8 cm$^2$. However, for ensuring the capacitive function, an insulating layer (not shown in FIG. 11*c*) between the two folds is required.

FIG. 11*b*-11*c* show the most common configuration of a palm side glove component that is a glove piece shaped to be aligned with the palm side of the glove wearer. However, other glove piece shapes to align to the palm side of the glove wearer are possible. The methods described in this patent are equally applicable to any alternative glove piece shapes and the corresponding layouts of configuring them.

FIG. 12 shows an embodiment of a classic/French cutting die 920 for a glove thumb component, including back and front piece of the thumb. This cutting die 920 for the thumb piece is positioned on a fully split leather piece 100 having the upper split leather 110 and the lower split leather 130 and in between a functional layer 120. The cut piece 100 has a width $W_{100}$ and a length $L_{140}$ prior to be cut with the cutting die 920. After the use of the cutting die 920, cutting waste 107 will be removed and the respective length of the thumb component, having a three layered sandwich structure, will be altered according to the outline of the cutting die 920 having a nose 913 and two arcs 911, 912 for the tip of the thumb.

FIG. 13 shows a piece of leather, which was first entirely split, and then cut with the die 920. FIG. 13 shows an explosive view of a thumb component, wherein there is still the need to assemble the three layers and two layers respectively, in order to form a two and three layered sandwich structure respectively. The sandwich structure or final laminate (not shown in the explosive view) can be achieved for example by attachment means such as an adhesive.

The cutting die 920 results in the typical form of a thumb component: The outlines of the upper split leather layer 110 and the lower split leather layer 130 show on the left hand a nose 913, wherein a first arc 911 indicates the inner thumb area and the second arc 912 on the right hand the outer thumb area. Once the sandwich structure is laminated the two arcs 911, 912 can be superimposed and then attached to each other such that a thumb is formed, wherein the functional layer 120 is positioned inside the assembled thumb. FIG. 13 shows schematically that the functional area 120 is only positioned in the inner half of the thumb, which is surrounded by the first arc. Once the glove is assembled according to common techniques such as stitching or other attachment means, the functional layer will be in the correct place of the thumb in order to facilitate e.g. the operation of a capacitive touch screen device. It is noted that other shape configurations for thumbs diverting from the classic/French layout are possible, and that the methods described herein are equally applicable to alternative component layouts, such as alternative thumb layouts.

FIG. 14 shows an exploded view of a sandwich structure of another embodiment for a thumb component, which after attaching the shown layers 110, 120, 130 is configured to be combined with a further similarly shaped thumb component without a nose to form the final thumb of glove. That is to say for assembling the final glove a further seam is necessary and the thumb is not made of one piece as shown in FIG. 13 but of two pieces. However, the second piece of the thumb component is not shown in FIG. 14. As in FIG. 13, the functional layer 120 is only positioned in the region of the inner thumb area which faces the inner palm of the glove wearer.

Figure 15B:
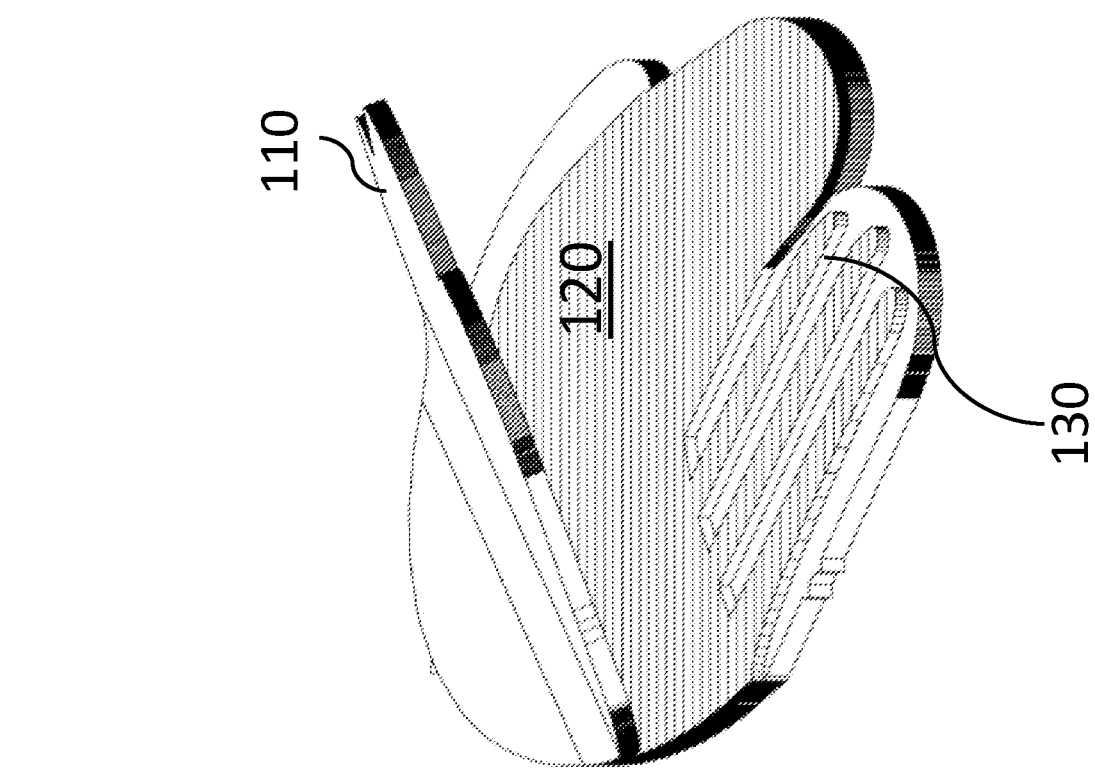
FIG. 15b shows a perspective view of a thumb piece of a glove obtained from a partially split leather and a partial three layered sandwich structure.
Figure 15A:
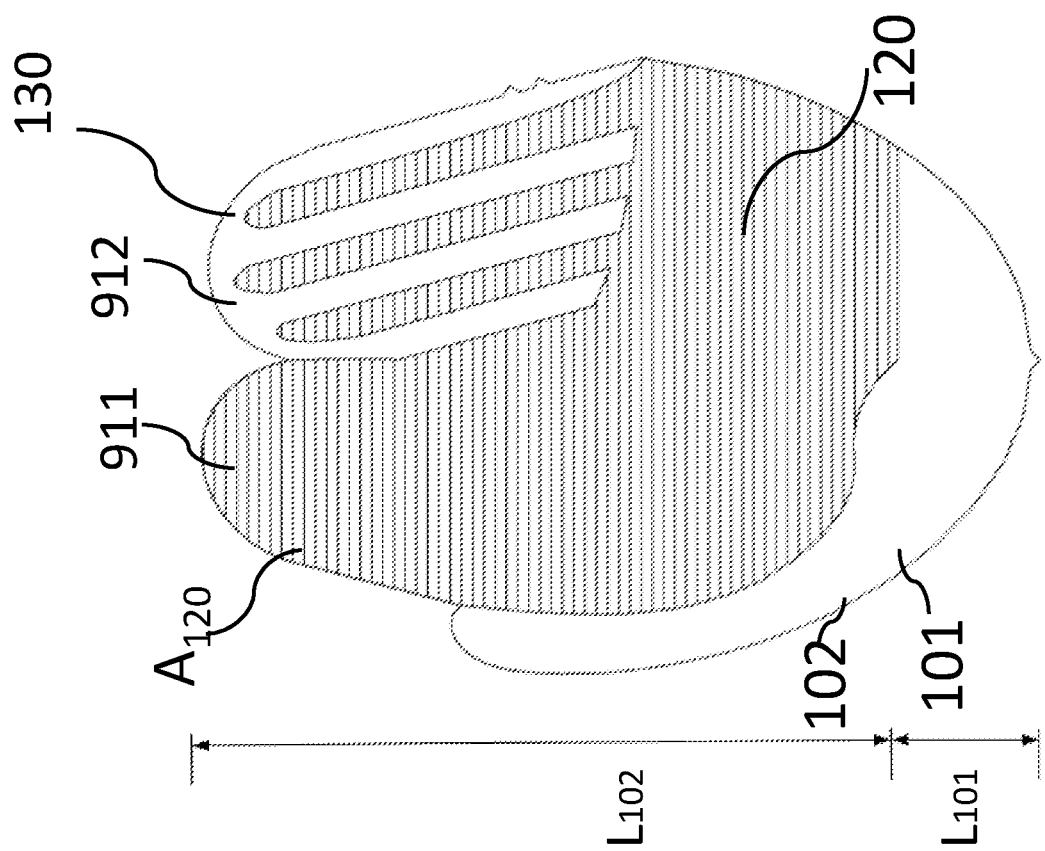
FIG. 15a shows a top view of a thumb piece of a glove obtained from a partially split leather and a partial two layered sandwich structure.

FIG. 15*a* and FIG. 15*b* show again a thumb component for a glove wherein the dimension is chosen as according to the cutting die 920. This cut glove component of a thumb is dimensioned to entirely cover a thumb once assembled. In contrast to the other figures of the thumb component shown in FIG. 12 to FIG. 14, the leather is now not entirely split but partially split. The arrows on the left hand side show the extension of the glove component in the longitudinal direction wherein the length $L_{102}$ indicates the length of the split portion 102 of the leather and the length $L_{101}$ indicates the length of the unsplit leather portion 101.

In the split portion 102 the functional layer 120 is positioned upon the lower split leather 130. The functional layer 120 is dimensioned such that, once the glove is worn, is extending at least over the entire surface of the thumb facing the inner palm area. Further on the thumb component on the right-hand side (below the second arc 912) only a partial coverage with the functional layer 120 is foreseen because this area will constitute the outer part of the thumb once the glove is assembled and donned. The special dimensions of the functional layer 120 are an example of a design with increased flexibility in the vicinity of the second arc 912, which can be advantageously used were the chosen functional layer adds a level of rigidity (as in the vicinity of arc 911, where a continuous surface is provided), which rigidity level is deemed adverse compared to that of the specific leather used. If the functional layer is used as a capacitive functional layer then the thickness of the upper split leather 110 can be selected to be 0.4 mm+/−0.05 mm and the total surface area of $A_{120}$ should measure minimum 50 cm² to enable effective operation of a capacitive touch screen device.

Figure 16B:
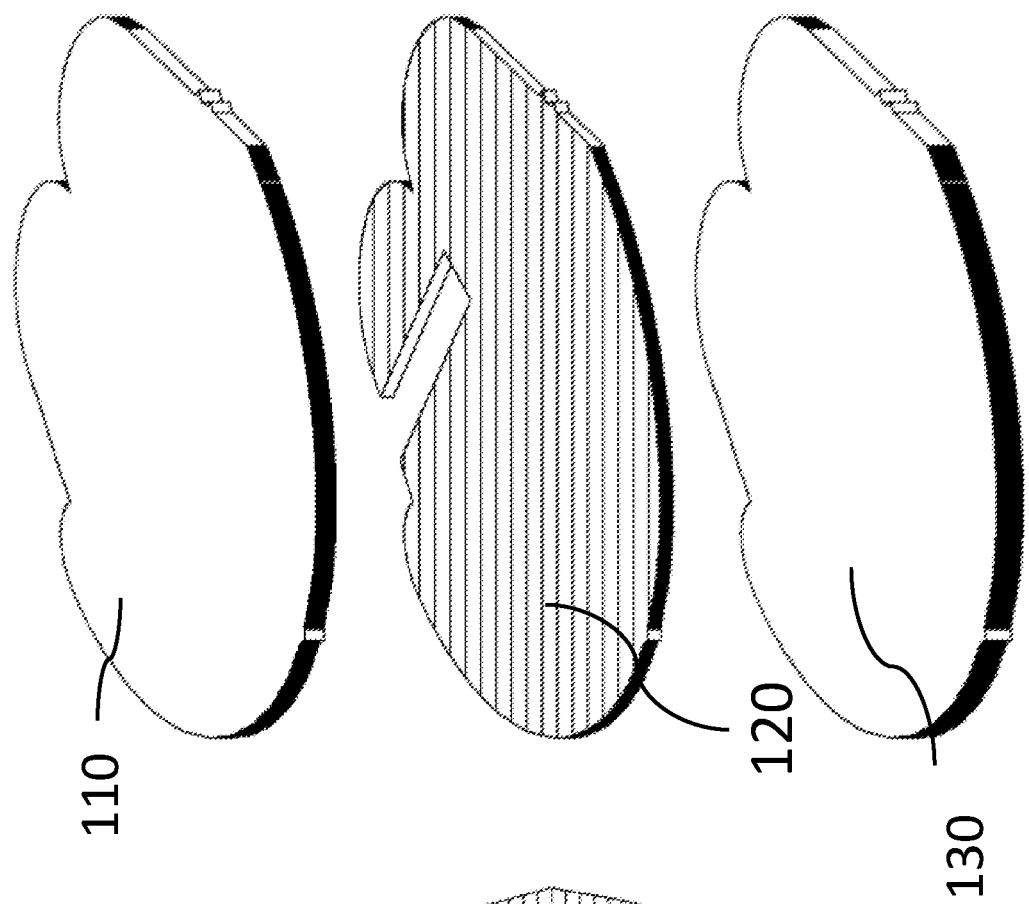
FIG. 16b shows a perspective view of a thumb piece of a glove with the functional layer of FIG. 16a between an upper and lower split leather to form at least partially a three layered sandwich structure.
Figure 16A:
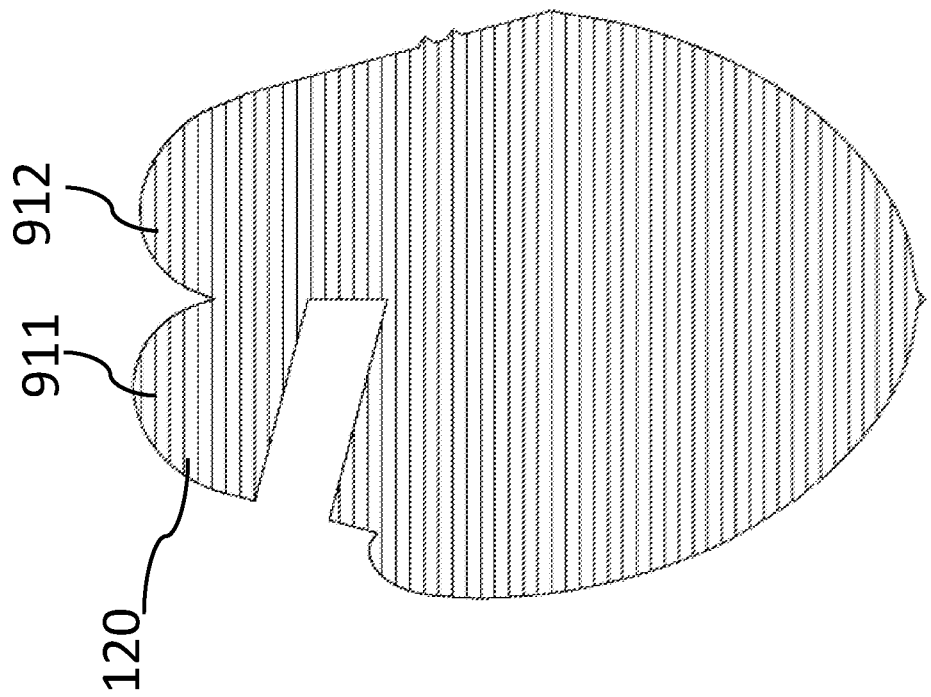
FIG. 16 a shows a top view of a functional layer for a thumb piece of a glove.

FIG. 16a shows the top view of another embodiment of another design of a functional layer 120 for a thumb piece of a glove. FIG. 16b shows the functional layer design of FIG. 16a between an upper and lower split leather 110 and 130 to form at least partially a three layered sandwich structure. Once the three layers of FIG. 16b are assembled and attached to each other using an adhesive or other attachment means, the functional layer 120 is forming a three layered sandwich structure except for a small cut-out region in the thumb below the arc 911 in order to facilitate movement of the thumb and bending thereof.

Figure 17B:
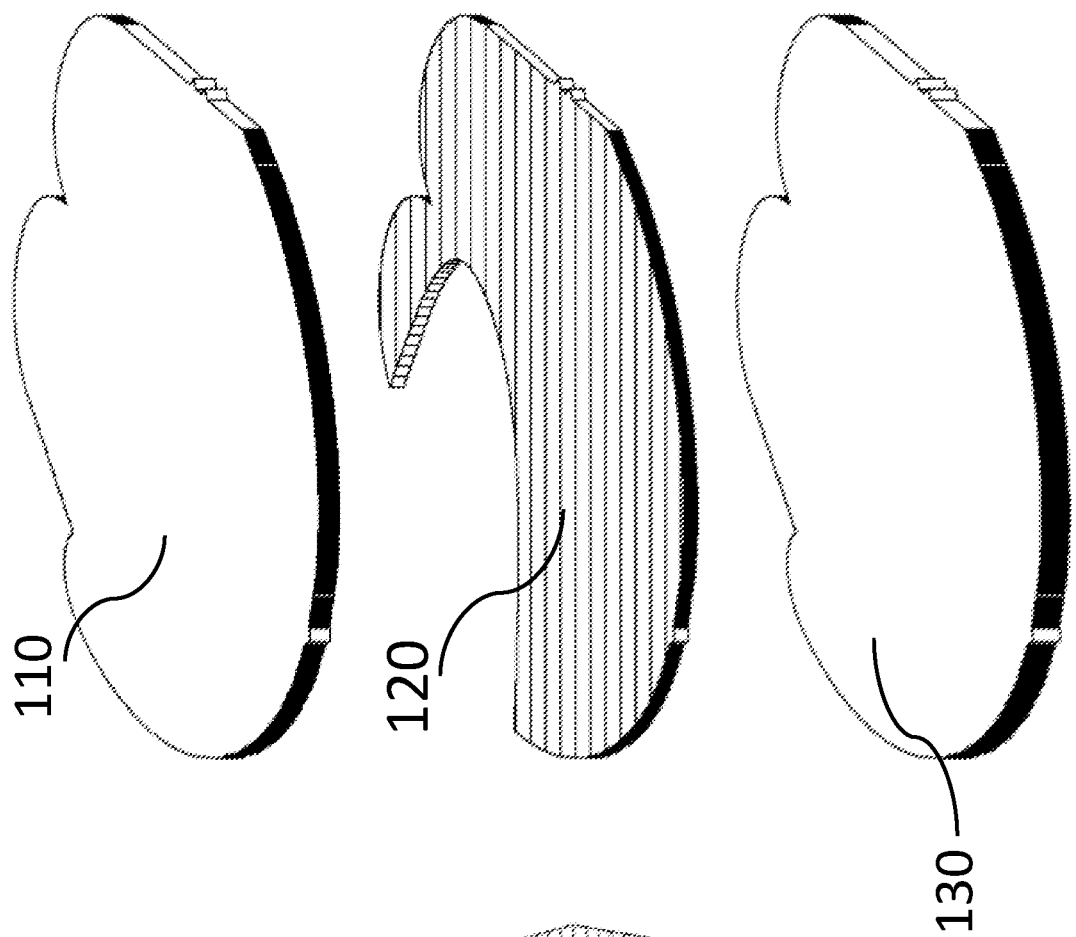
FIG. 17b shows a perspective view of a thumb piece of a glove with the functional layer of FIG. 17a between a first and second layer of a fully split leather to form at least partially a three layered sandwich structure.
Figure 17A:
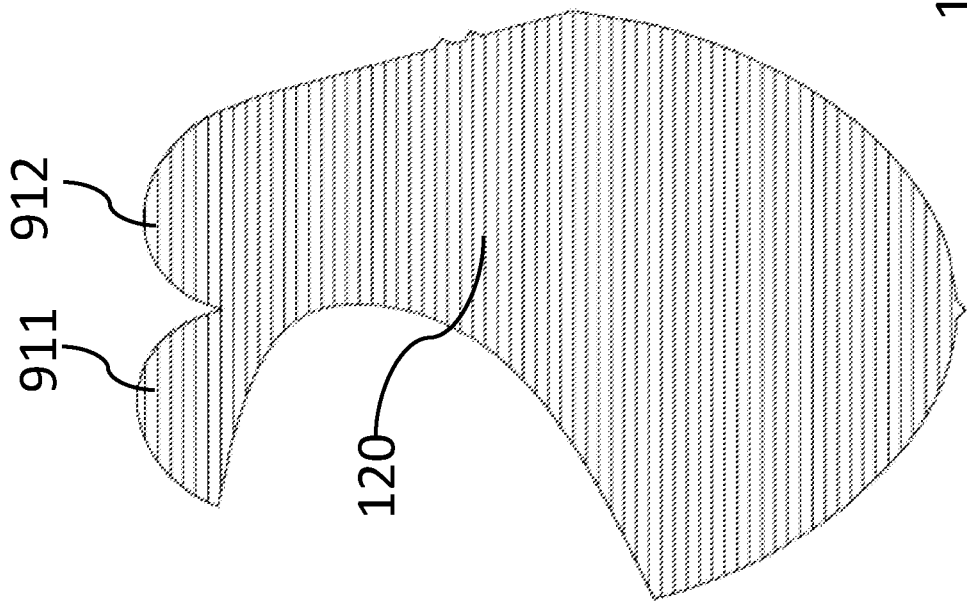
FIG. 17a shows a top view of another embodiment of a functional layer for a thumb piece of a glove.

FIG. 17a shows the top view of another embodiment of a functional layer 120 for a thumb piece of a glove. Similar as in FIGS. 16a and b there is a cutout or cutting in the thumb region on the left-hand side. This cutting is also facilitating bending of the thumb towards the palm of the glove wearer. FIG. 17b shows an entirely split leather which needs to be assembled to form a thumb portion of the final glove with a functional layer 120. Once the thumb of the glove is stitched together the functional layer 120 will not be seen from the outside of the glove and the wearer has the impression that the glove is a common leather glove. However due to the sandwiched structure, including the functional layer 120, a capacitive touch screen device can be operated or abrasive resistance be improved.

Figure 18:
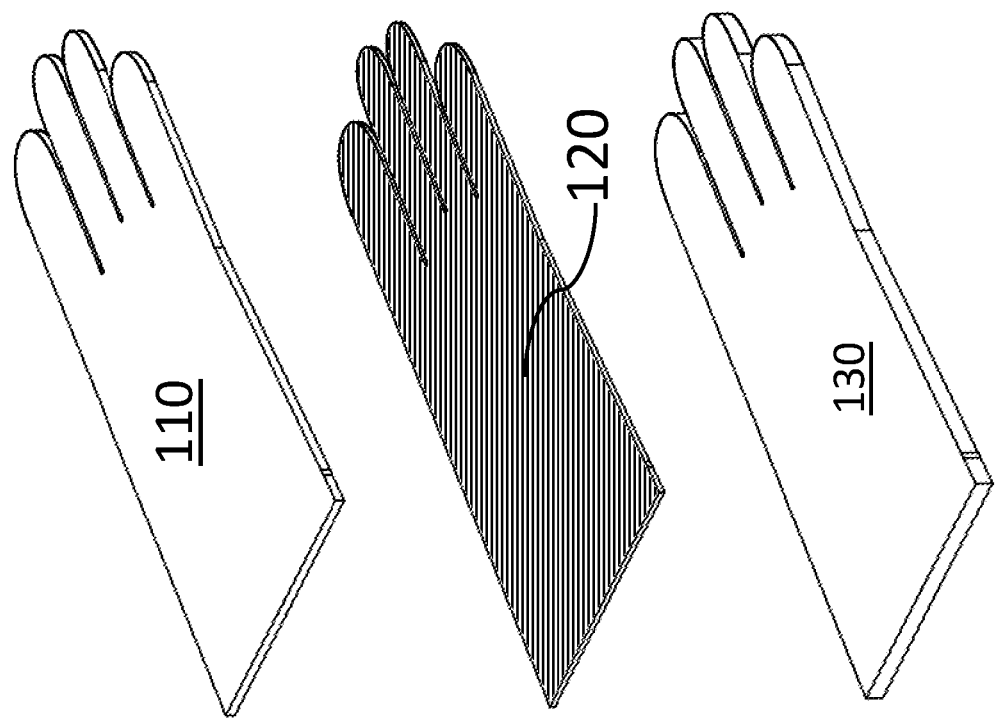
FIG. 18 a shows a perspective view of a fully split cut piece of leather cut to a glove palm component comprising a functional layer over the entire area of said component to form after laminating a three-layered sandwich structure.

FIG. 18 shows a perspective view of a fully split cut piece 100 of leather, cut to a glove palm component comprising a functional layer 120 over the entire area of said component. In order to obtain the outline of a finger glove, cutting die 910 can be used as shown for example in FIG. 19. The second layer 120 is selected from a group comprising a conductive sheet, a reinforcement sheet, an abrasive resistant layer, an anti-microbial, anti-bacterial and/or anti-viral sheet. Further a water-resistant membrane, a heat or flame resistant layer or a flexible near field communication device can be provided as the functional layer 120.

If the functional layer has a thickness of less than 0.5 mm or 0.2 mm and is itself non-rigid in nature, then the flexibility of the assembled glove as a three layered sandwich will be similar to unsplit leather. The functional layer can be attached by attachment means such as stitching or an adhesive.

Figure 19:
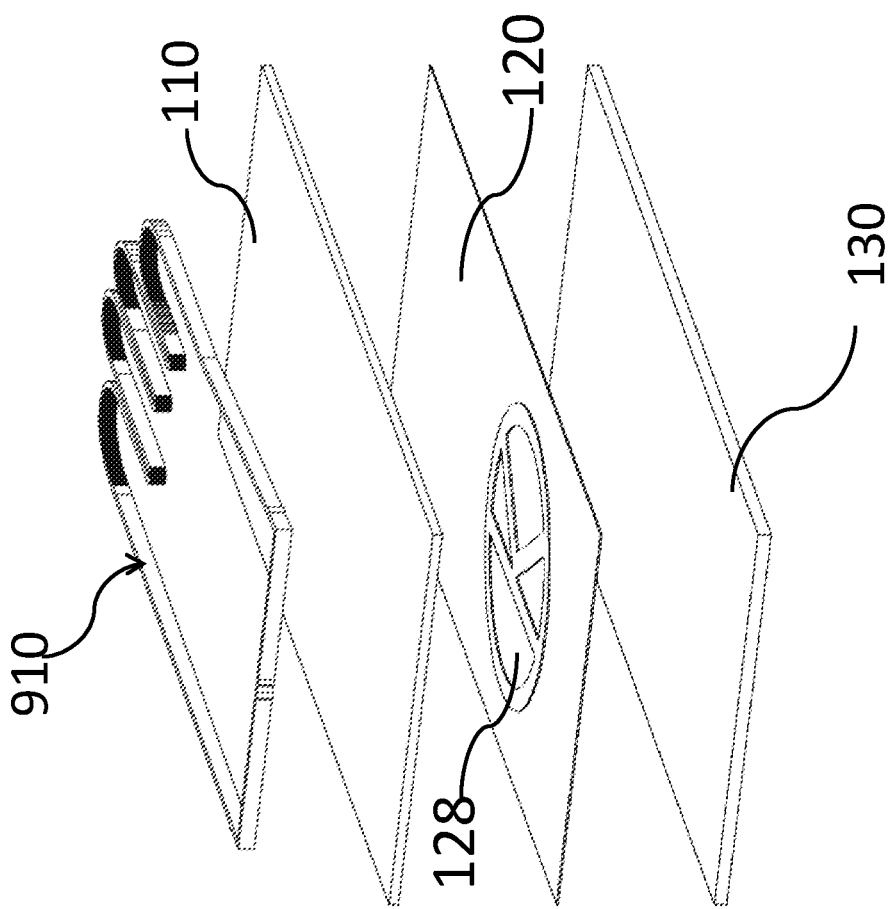
FIG. 19 shows a cutting die for a back-component of a glove and a fully split cut piece of leather with a functional layer made of rubber or foam material and having protruding or embossed structures.

Another kind of functional layer is shown in FIG. 19. FIG. 19 shows a cutting die 910 for a back component of a finger glove and a fully split cut piece 100 with a functional layer 120. The functional layer 120 is characterized by a three dimensional layer with protruding structures 128 relative to the thickness of the layer 120. In FIG. 19 the protruding structure 128 shows a letter K in a circle. Various other structures than shown (protruding or depressed) can be provided. After assembling and attaching the three layers to each other, the three dimensional structure of the pattern 128 can be felt from the side of the upper split leather 110. Thus, a design feature can be embedded within the leather, so that side of the lower split leather 130 remains flat and appears unaltered whereas the side of the upper split 110 contains an embossing or debossing, which in unlined gloves is preferable to existing embossing and debossing solutions, as the portion touching the wearers skin will remain an unaltered even surface. Thus the final glove will have a perceptible function and could be used for example as an indicator for right hand gloves. Such an indicator could also be used to point to functions as for example a smart function of a flexible near field communication device or a capacitive functional portion.

FIG. 20a shows the cutting die 910 for a back component for a fully split leather which has been split into the upper split leather 110 and the lower split leather 130. The functional layer 120 is especially designed to have a three dimensional structure with depressed and/or elevated or protruding lines 129. Such protruding three dimensional structures 129 can be designed to optimize protective properties, such as resistance to abrasion or puncture in certain preferable areas of the glove, such as at the height of the joints of the fingers. Such elements can also be used to incorporate design features into the cut piece and, subsequently, the shaped glove piece.

Figure 21B:
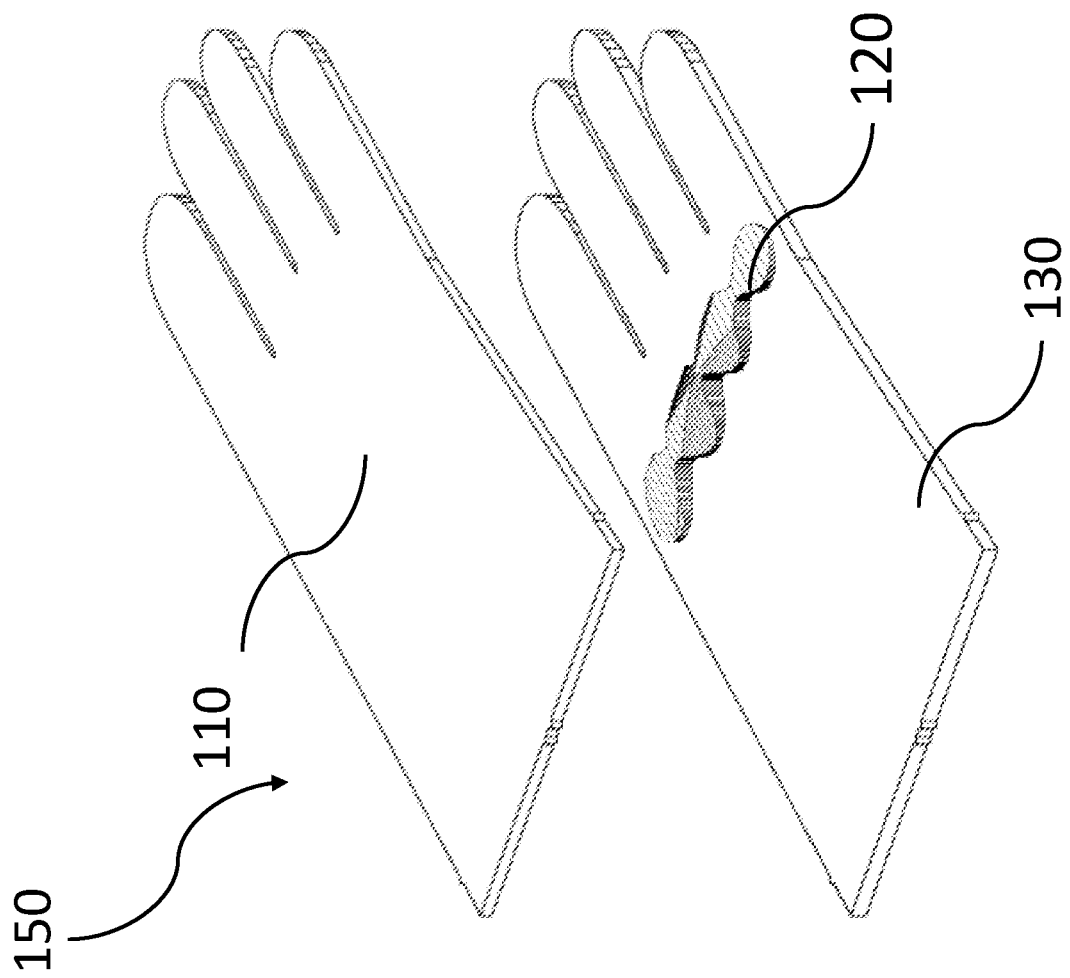
FIG. 21b shows a perspective view of the back-component of FIG. 21a and an upper split leather to be arranged on top thereof.
Figure 21A:
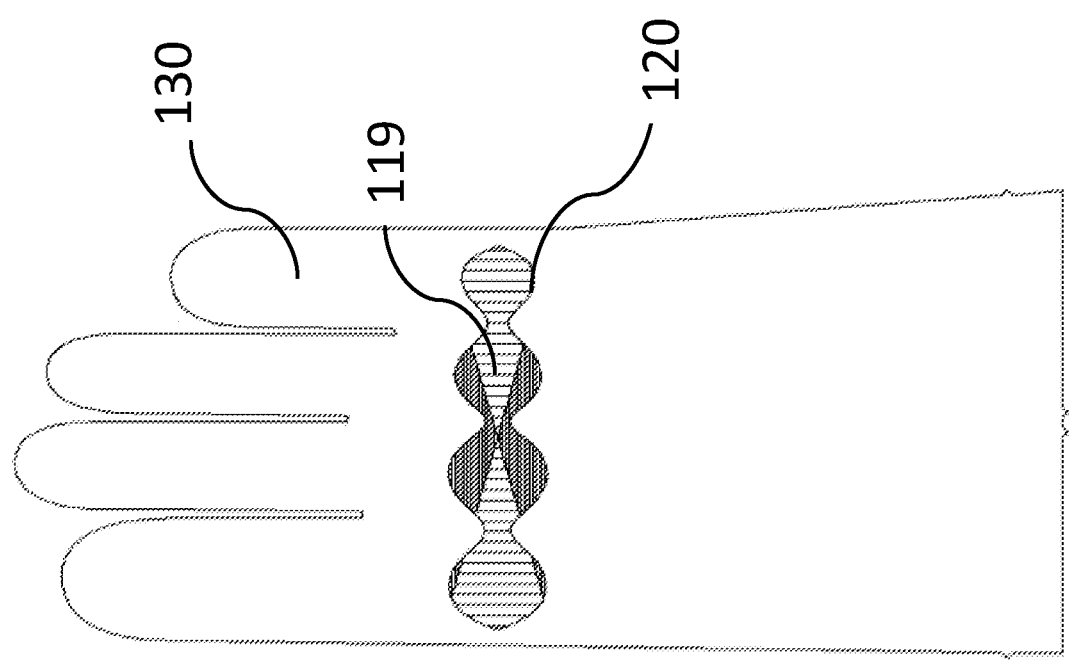
FIG. 21a shows a top view of a lower split leather for the back-component of a palm piece of a glove having a three-dimensional structure in the height of the knuckles of the glove wearer.

FIG. 21a shows a top view of a lower split leather 110 for the back component of a palm piece of a glove having as functional layer 120 a three dimensional structure 119 in the height of the knuckles of the glove wearer.

FIG. 21b shows the corresponding perspective view wherein in addition the upper split leather 110 is shown. Once the upper split leather layer 110 and the third layer of the lower split leather 130 is assembled, a final leather product 150 will be formed, wherein the knuckles of the glove wearer are protruding for protection of this specially stressed area of the glove.

Figure 22:
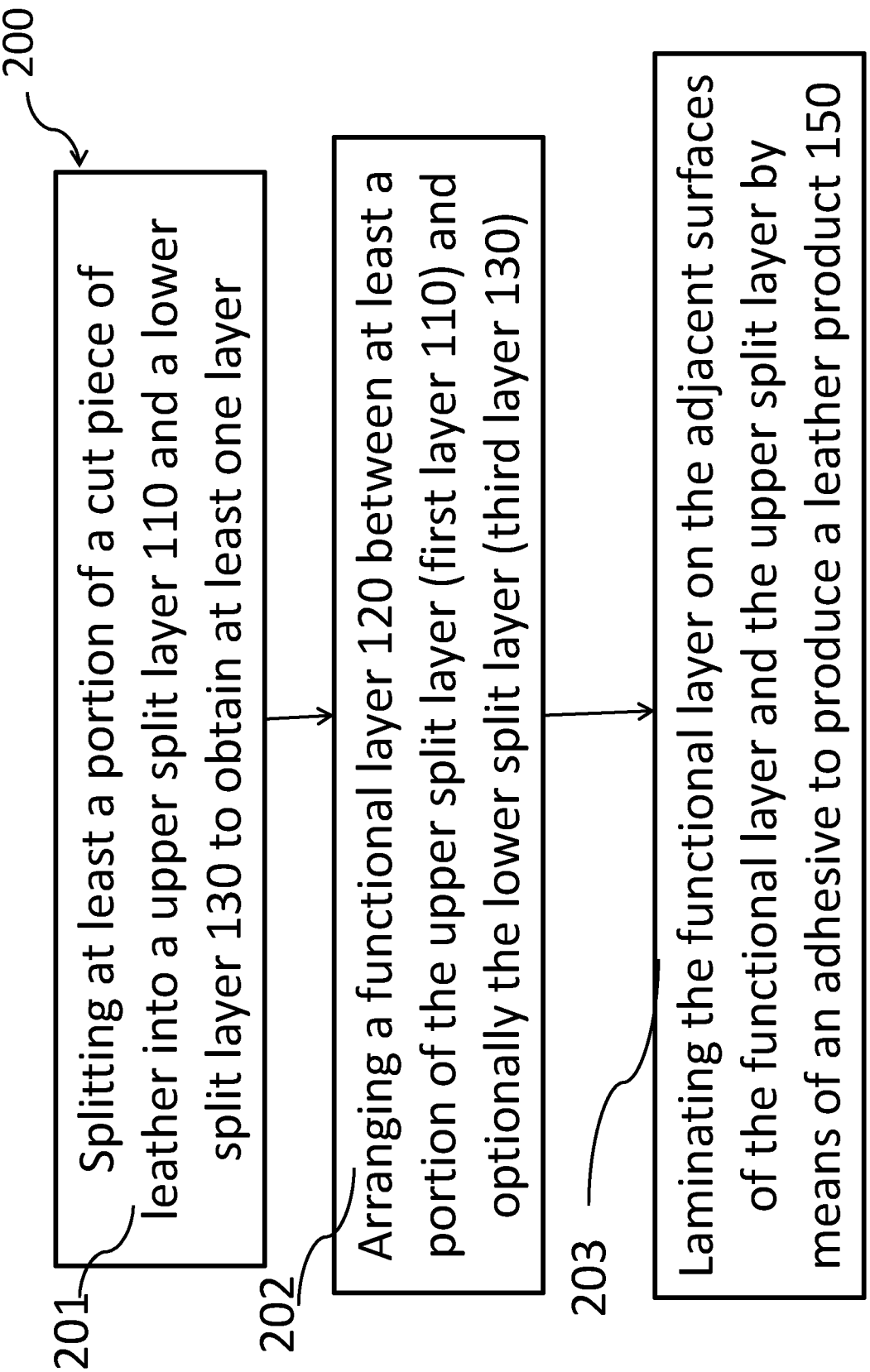
FIG. 22 shows a flow diagram of the method steps of a method according to the present invention.

FIG. 22 shows a method 200 according to the present disclosure wherein the method step 201 comprises splitting at least a portion of a cut piece 100 of leather into a upper split layer 110 and a lower split layer 130 to obtain at least one of said layers and preferably the upper split layer 110. It is noted that prior to the splitting step 201 a pre-cut is necessary in order to achieve the cut piece 100 of a specific geometry. Said geometry of the cut piece 100 is necessarily larger than the final glove component and maybe of rectangular shape.

The further method step 201 comprises arranging a functional layer 120 between at least a portion of the upper split layer (first layer 110) and optionally the lower split layer (third layer 130). Method step 203 comprises laminating the functional layer 120 on the adjacent surfaces of the functional layer and the upper split layer using an adhesive to produce a leather product 150.

Figure 23:
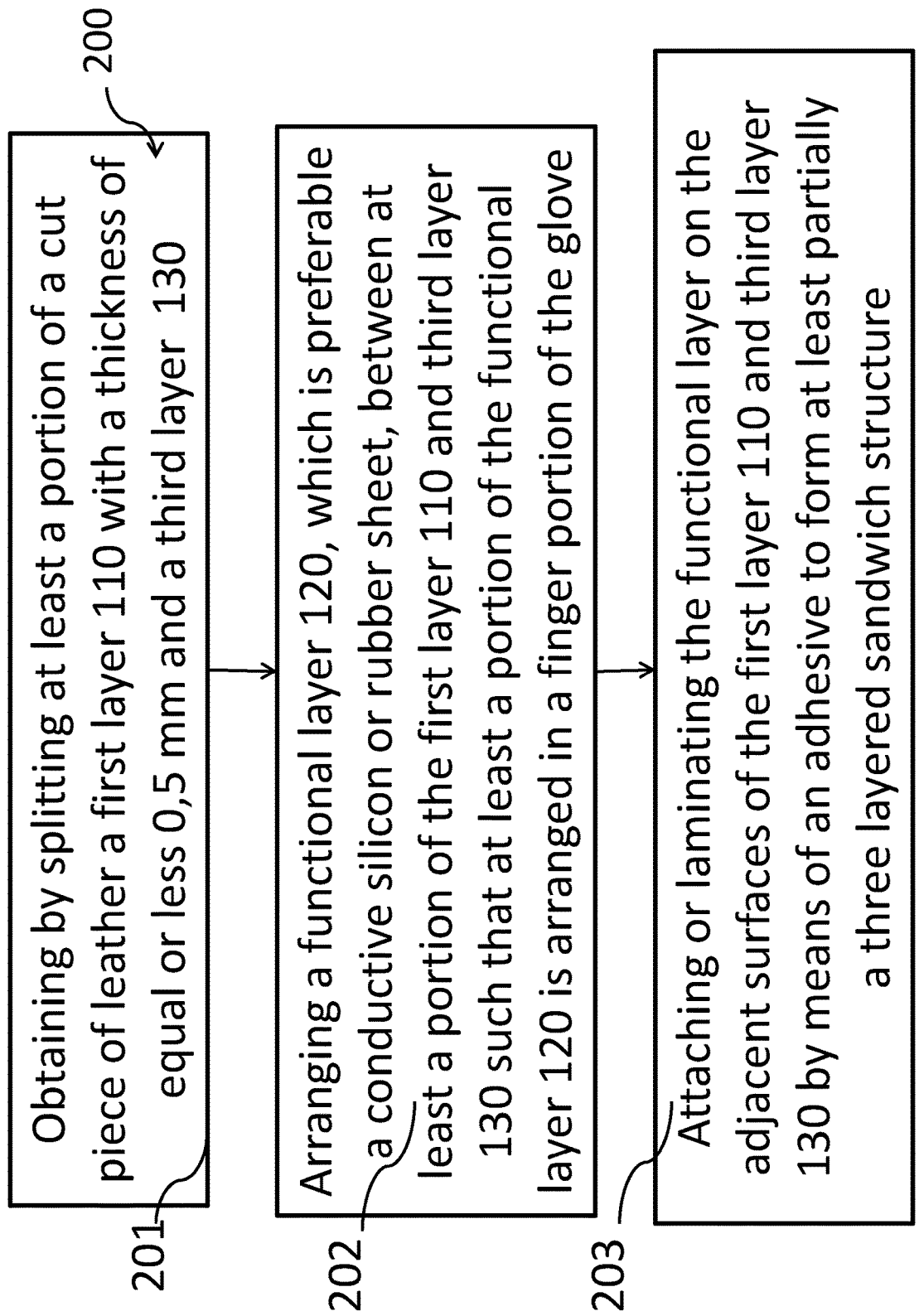
FIG. 23 shows another embodiment of a method according to the present invention.
Figure 24:
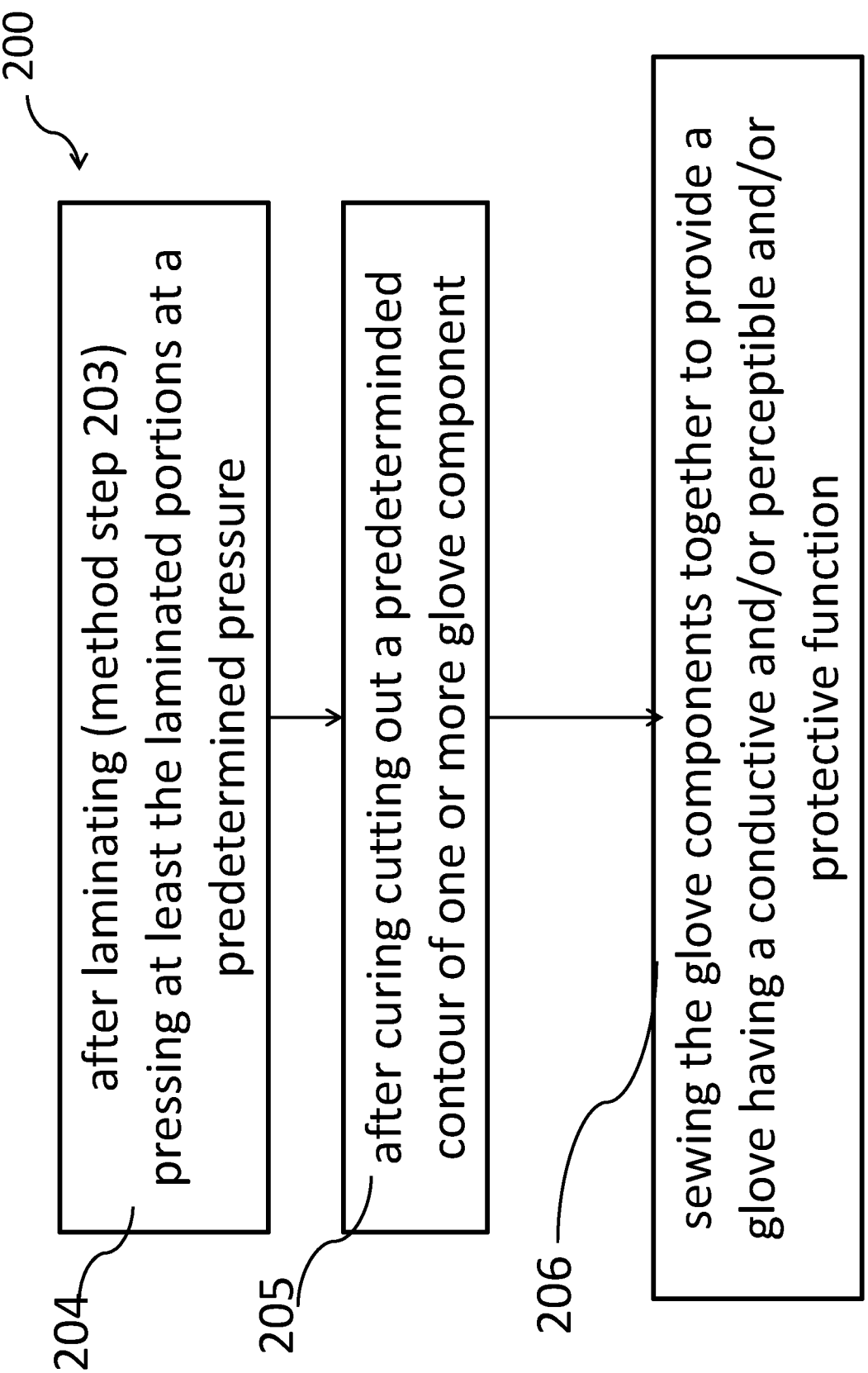
FIG. 24 shows further method steps according to another embodiment of the method according to the present invention.

FIG. 23 shows a further embodiment of the method 200 according to the present disclosure in order to provide a capacitive function, wherein the method step 201 further comprises obtaining a first layer 110 with a thickness of equal or less 0.45 mm and a third layer 130 by splitting at least a portion of a cut piece 100 of leather.

Moreover, the method step 202 further comprises arranging a functional layer 120, which is preferable a conductive silicon or rubber sheet, between at least a portion of the first layer 110 and third layer 130 such that at least a portion of the functional layer 120 is arranged in a finger portion of a finally assembled glove.

The method step 203 to obtain a three layered sandwich structure instead of a two layered sandwich structure further comprises the following features:

Attaching or laminating the functional layer 120 on the adjacent surfaces of the first layer 110 and third layer 130 using an adhesive to form at least partially a three layered sandwich structure after laminating (method step 203).

According to another aspect of the method 200 the method further comprises the following method steps:

According to method step 204 pressing at least the laminated portions at a predetermined pressure.

According to method step 205 cutting out a pre-determined contour of one or more glove component after curing; and According to method step 206 sewing the glove components together to provide a glove having a conductive and/or perceptible and/or protective function.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims. As used herein, the term "plurality" refers to two or more items or components. The terms "comprising", "consisting of", "including", and "having", whether in the written description or the claims and the like, are open-ended terms, i.e., to mean "including but not limited to".

Use of ordinal terms such as "first", "second", "third", and the like in the claims to modify a claim element does not by itself connote any priority, precedence, or order of one claim element over another, but are used merely as labels to distinguish one claim element having a certain name from another element having a same name (but for use of the ordinal term) to distinguish the claim elements. It is noted that the terms "upper" and "lower" used herein are intended to be limiting such that the upper split leather 110 is on the outside of a final glove. In case a lower split leather 130 is provided in the leather product 150 to form a three layered sandwich, said third layer is facing the skin of the glove wearer.

In this context it is noted that the dimensions shown in all Figures of this disclosure are not to scale. The illustrations are simplified and not in each drawing all components are indicated with reference numerals and like reference numerals may be carried forward.

REFERENCE LIST 100 cut piece of genuine leather or leather-like material
101 unsplit portion
102 split portion
107 cutting waste
110 upper split leather
111 outer grain layer
112 lower grain layer and/or junction zone
115 grain layer
117 splitting region
120 functional layer
121 bonding layer between upper split leather 110 and functional layer 120
123 bonding layer between lower split leather 130 and functional layer 120
125 adhesive
129 protruding three-dimensional structures
130 lower split leather
131 junction zone of grain and corium layer
132 upper corium layer
133 lower corium layer
135 corium layer
140 genuine leather or leather-like material
144 fourth layer
150 leather product
170 cutting edge in leather
200 method
201-206 first to sixth method steps
700 leather splitting machine
701, 702 clockwise moving pulley(s)
705 band cutter or band knife
710 feed table
711, 712 feed pulleys
715 feed device
730 splitting means
750 operational axis of the leather 100 and longitudinal axis of the feed table 710
770 line marking on feed table
800 electronic input device
810 capacitive touch screen
910 cutting die for palm piece including fingers
911 first arc of thumb component
912 second arc of thumb component
913 nose of thumb component
920 cutting die for thumb piece
$A_{120}$ surface area of functional layer
$L_{140}$ length of cut piece of leather
$W_{100}$ width of cut piece of leather
$t_{100}$ thickness genuine leather
$t_{110}$ thickness upper split or first layer
$t_{130}$ thickness lower split or third layer

What is claimed is:

1. A functional leather product for a glove having a capacitive,
near field communication enabling, perceptible and/or protective function, the leather product comprising:
leather in form of a cut piece comprising at least in part a sandwich structure of at least two layers;
wherein said sandwich structure comprises:
a first layer, which comprises an upper split leather obtained by at least partially splitting said cut piece of leather parallel to its upper surface at a predetermined cross-sectional depth of maximum 4.95 mm; and
a second layer comprising a functional layer,
wherein the functional layer is attached at least in part to the first layer;
wherein the overall thickness of the first layer is in the range of from about 0.05 mm to 0.45 mm;
wherein the functional layer is a conductive silicon sheet or a conductive rubber sheet and the functional layer has an area of at least approximately 50 cm$^2$; and
wherein the conductive silicon sheet or conductive rubber sheet has a surface resistivity of less than 1000 Ohm per square and/or a volume resistivity of less than 5 Ohm-cm.

2. The functional leather product according to claim 1, wherein the second layer has a thickness of less than about 1 mm.

3. The functional leather product according to claim 1, wherein the sandwich structure further comprises:

a third layer, which is the lower split leather obtained from at least partially splitting said cut piece of leather and is adapted to have the longitudinal extension of the first layer or less;
   wherein the third layer is attached to the surface of the second layer and optionally the first layer.

4. The functional leather product according to claim 1, wherein the cut piece of leather consists of genuine leather and is cut from hides or skins, wherein the upper split leather and/or the lower split leather are obtained by splitting parallel to the surface at the cross-sectional depth of the junction zone between the grain layer and corium layer of the genuine leather.

5. The leather product according to claim 4, wherein the lower split leather comprises the entire corium layer or at least a portion of the corium layer.

6. The leather product according to claim 1, wherein the upper split leather comprises an upper layer of the corium layer and/or at least a portion of the grain layer.

7. The functional leather product according to claim 1, wherein the conductive silicon sheet or conductive rubber sheet incorporates conductive carbon.

8. The functional leather product according to claim 3, wherein the outer surface of the upper split leather and/or the lower split leather has a surface resistivity of greater than 109 Ohms per square.

9. The functional leather product according to claim 1, wherein the third layer is attached to the surface of the second layer and optionally the first layer by attachment means, and the attachment means are selected from the attachment means consisting of: stitch bonding, an adhesive, a solvent-based adhesive, a water-based adhesive, a polyurethane resin adhesive, an acrylic resin adhesive, polyester resin a polyamide resin, a silicone-based adhesive, a rubber based adhesive, adhesive cross filament tape or combinations thereof.

10. The functional leather product according to claim 9, wherein the adhesive is disposed at least partially on the surface of at least one of the first layer and third layer in order to laminate the functional layer using a bonding layer to at least one of the first and third layer;
   wherein the adhesive of the bonding layer is flexible and/or repositionable and optionally comprises an active agent selected from the group consisting of a perfuming composition, a deodorizing composition, an aroma agent, an insecticidal substance, an antimicrobial substance, a virucidal substance, a bactericidal substance or combinations thereof.

11. A method for producing a functional leather product for a glove having a capacitive and/or perceptible and/or protective function of claim 1, the method comprising the following steps:
   obtaining a first layer in form of an upper split leather by splitting at least a portion of a cut piece leather at a predetermined cross-sectional depth of maximum 4.95 mm using a splitting machine; and
   attaching a second layer in form of a functional layer at least partially to the upper split leather to form a two layered sandwich structure.

12. The method according to claim 11, wherein the method step of splitting further comprises obtaining from said cut piece of leather a third layer in form of a lower split leather;
   wherein the second and functional layer is a conductive silicon sheet or a conductive rubber sheet having an area of at least approximately 50 cm$^2$ if the first layer has a maximum thickness of about 0.5 mm, after splitting arranging the functional layer between at least a portion of the lower split leather and the upper split layer such that at least a portion thereof is arranged in one or more glove fingers for use with a capacitive touch screen; and
   wherein attaching comprises further attaching the lower split leather at least partially to the functional layer to form a three-layered sandwich structure.

13. A method according to claim 11, wherein attaching comprises laminating by means of an adhesive and the following method steps:
   laminating to the opposing surfaces of the two first and third layer the adhesive and thereafter pressing at least the laminated portions at a predetermined pressure for a predetermined period of time of less or equal 24 hours; and
   after curing out a predetermined contour of one or more glove components selected from a group comprising:
   palm section, section to enclose four fingers, thumb section, cuff, sleeve further common workpieces and combinations thereof, and optionally
   prior to laminating the first and/or third layer is subject to a compressive force in order to produce the thickness of the first and/or third layer such that the thickness of the sandwich structure of the final leather product is equal or less than the thickness of the original cut piece of leather.

14. The functional leather product according to claim 1, wherein the second layer is selected from a group of functional layers comprising:
   a conductive sheet, a reinforcement sheet, an abrasive resistant layer, a three-dimensional layer with elated or depressed structures relative to said thickness, an antimicrobial, an antibacterial and/or antiviral sheet, a water-resistant membrane, a heat or flame resistant layer, a flexible near field communication device or combinations thereof.

15. The functional leather product according to claim 13, wherein the conductive sheet has a surface resistivity of less than 1000 Ohm per square and/or a volume resistivity of less than 5 Ohm-cm.

16. A functional leather product for a glove having a capacitive, near field communication enabling, perceptible and/or protective function, the leather product comprising:
   leather in form of a cut piece comprising at least in part a sandwich structure of at least two layers;
   wherein said sandwich structure comprises:
   a first layer, which comprises an upper split leather obtained by at least partially splitting said cut piece of leather parallel to its upper surface at a predetermined cross-sectional depth of maximum 4.95 mm; and
   a second layer comprising a functional layer,
   wherein the overall thickness of the first layer is a maximum of 0.50 mm;
   wherein the functional layer is attached at least in part to the first layer;
   wherein the functional layer is a conductive silicon sheet or a conductive rubber sheet; and
   wherein the conductive silicon sheet or conductive rubber sheet has a surface resistivity of less than 1000 Ohm per square and/or a volume resistivity of less than 5 Ohm-cm.

17. The functional leather product according to claim 16, wherein the overall thickness of the first layer is in the range of 0.05 mm to 0.1 mm and the functional layer has a minimum area of 1 cm$^2$.

18. The functional leather product according to claim 16, wherein the overall thickness of the first layer is 0.25 mm and the functional layer has a minimum area of 8 cm².

19. The functional leather product according to claim 16, wherein the overall thickness of the first layer is at pr below 0.25 mm and the functional layer has a minimum area of 5 cm².

\* \* \* \* \*